(12) United States Patent
Oleynik

(10) Patent No.: US 6,853,675 B1
(45) Date of Patent: Feb. 8, 2005

(54) METHODS AND SYSTEMS FOR OPTIMIZING SIGNAL TRANSMISSION POWER LEVELS IN A SPREAD SPECTRUM COMMUNICATION SYSTEM

(75) Inventor: Vladislav A. Oleynik, Chapel Hill, NC (US)

(73) Assignee: Umbrella Capital, LLC, Miami, FL (US)

( * ) Notice: Subject to any disclaimer, the term of this patent is extended or adjusted under 35 U.S.C. 154(b) by 651 days.

(21) Appl. No.: 09/636,177

(22) Filed: Aug. 10, 2000

(51) Int. Cl.[7] ............................................. H04B 1/69
(52) U.S. Cl. .................. 375/130; 370/347; 370/442; 370/342; 370/535
(58) Field of Search ...................... 455/69, 522, 13.4, 455/574, 70; 370/335; 375/130

(56) References Cited

U.S. PATENT DOCUMENTS

| | | | |
|---|---|---|---|
| 5,267,262 A | | 11/1993 | Wheatley, III |
| 5,383,219 A | | 1/1995 | Wheatley, III et al. |
| 5,487,180 A | | 1/1996 | Ohtake |
| 6,035,209 A | | 3/2000 | Tiedemann, Jr. et al. |
| 6,088,573 A | * | 7/2000 | Tsuda ........................ 455/13.4 |
| 6,278,701 B1 | * | 8/2001 | Ayyagari et al. ............. 370/335 |
| 6,298,220 B1 | * | 10/2001 | Barnhart et al. .............. 455/69 |

* cited by examiner

Primary Examiner—Shuwang Liu
Assistant Examiner—Eva Zheng
(74) Attorney, Agent, or Firm—Jenkins, Wilson & Taylor, P.A.

(57) ABSTRACT

According to one aspect, a spread spectrum communications system is capable of automatically adjusting transmission power level so as to optimize one or more aspects of the spread spectrum communication system performance. The spread spectrum communications system is comprised of a first spread spectrum transmitter, an associated first spread spectrum receiver, and a feedback communication system. The first spread spectrum transmitter is adapted to transmit a spread spectrum type signal. The first spread spectrum receiver is adapted to receive the spread spectrum type signal sent by the first spread spectrum transmitter and to subsequently generate transmission power level control information, which is conveyed to the first spread spectrum transmitter via a feedback communication system. The first spread spectrum transmitter is further adapted to receive and process transmission power level control information that is provided by the feedback communication system, and subsequently adjust transmission power in accordance with the received transmission power level control information.

26 Claims, 14 Drawing Sheets

METHODS AND SYSTEMS FOR OPTIMIZING SIGNAL TRANSMISSION POWER LEVELS IN A SPREAD SPECTRUM COMMUNICATION SYSTEM

TECHNICAL FIELD

The present invention relates to techniques for the determination and subsequent utilization of optimal transmission power levels in a spread spectrum communication system.

BACKGROUND ART

The communication technique known as spread spectrum (SS) was developed during World War II with the primary intent of protecting military and diplomatic communications. Spread spectrum communication techniques differ from conventional narrow-band communication techniques because they spread, rather than concentrate, transmitted signals over a wide frequency range. In other words, spread spectrum communication systems effectively spread a narrow-band information signal into a corresponding wideband signal that closely resembles background radio frequency (RF) noise. Such noise-like characteristics are one of the great advantages of spread spectrum communication systems. That is, because spread spectrum signals are noise-like, they are difficult to detect and hence, there is an inherently high degree of security with SS type communication techniques. Consequently, SS has been and remains the communication technique of choice for many military applications. Without going into great detail, it should also be appreciated that, for similar reasons, SS signals are also difficult to intercept and even more difficult to jam or interfere with than conventional narrow-band signals. Again, such exceptional low probability of intercept (LPI) and anti-jam (AJ) characteristics are why the military has used SS based communication systems for so many years.

Spectrum signals are so wide, they transmit at a much lower power spectral density (Watts per Hertz), than conventional narrow-band transmitters. This lower transmitted power spectral density characteristic is another significant advantage of SS communication systems, as SS and narrow band signals can occupy the same band, with little or no interference. Consequently, SS communication systems exhibit a high degree of immunity to interference generated by other equipment. As a result of this interference immunity, the Federal Communications Commission and other national and international regulatory agencies allow RF equipment to transmit at higher power levels (i.e., longer range transmission) if spread spectrum transmission techniques are employed. Hence, there is significant commercial interest in SS communication systems today.

The expansion or widening of bandwidth in SS type communication systems is accomplished through the implementation of a pseudo-random sequence of binary information, known as a spreading code. The random quality of the spreading code is ultimately responsible for the noise-like appearance of the transmitted broadband SS signal. In reality, the binary sequence that comprises the spreading code is predictable, and consequently does repeat (hence the "pseudo" term). However, the randomness of the code is sufficient to minimize the possibility of accidental duplication or discovery, and as such the spreading code functions much like a security encryption key.

Spread Spectrum Modulation Techniques

With regard to spread spectrum type communication systems, the two most commonly employed signal-spreading techniques are direct sequencing and frequency-hopping. Both modulation techniques are characterized by wide frequency spectra and modulated output signals that occupy a much greater bandwidth than the information or baseband signal component. In general, to qualify as a spread spectrum signal, the transmitted signal bandwidth must be much greater than the information bandwidth and a function, dependent on information other than the information being transmitted, must be employed to determine the transmitted bandwidth. Many commercial spread spectrum communication systems transmit with a broadband signal bandwidth that is 20 to 250 times the bandwidth of the information being sent. Some spread spectrum systems have employed broadband bandwidths 1000 times their information bandwidth in order to reliably and securely communicate messages or data packets over great distances.

Direct sequence is perhaps one of the most widely known and utilized spread spectrum systems and it is relatively simple to implement, in that a narrow band carrier is modulated by a code sequence. More particularly, direct sequence spread spectrum (DSSS) systems are so called because they employ a high speed spreading code sequence, along with the basic information being sent, to modulate their RF carrier. The high speed spreading code sequence is used directly to modulate the carrier, thereby directly setting the transmitted RF bandwidth. Binary spreading code sequences as short as $2^4$ bits or as long as $2^{89}$ bits have been employed for this purpose, at code rates from under a bit per second to several hundred megabits per second. Direct sequence spectra vary somewhat in spectral shape depending upon the actual carrier and data modulation used. The most common signal modulation technique used in DSSS systems is known as binary phase shift keyed (BPSK) modulation. Using such a BPSK modulation scheme, the carrier phase of the transmitted signal is abruptly changed in accordance with this code sequence. Once again, as discussed above, it will be appreciated that the spreading code sequence is generated by a pseudo-random noise (PSN) generator and has a fixed length (i.e., after a given number of bits the code repeats itself exactly). The speed of the code sequence is called the chipping rate, measured in chips per second (cps). For direct sequence, the amount of spreading is dependent upon the ratio of chips per bit of information. At the receiver, the information is recovered by multiplying the incoming signal with a locally generated replica of the spreading code sequence. The result is a signal that is a maximum when the two signals exactly equal one another or are "correlated." The correlated signal might then be filtered and sent to a BPSK type demodulator.

Signals generated using this DSSS technique appear as noise in the frequency domain. The wide bandwidth provided by the spreading code allows the transmitted signal power to drop below the noise threshold without loss of information.

In another spread spectrum modulation scheme known as frequency hopping (FH), the desired wide-band frequency spectrum is generated in a different manner. In the FH scheme, the carrier frequency of the transmitter abruptly changes (or hops) in accordance with a pseudo random spreading code sequence. The specific order in which frequencies are occupied is a function of the spreading code sequence, and the rate of hopping from one frequency to another is a function of the information rate. A spread spectrum FH receiver is capable of tracking these frequency changes and re-produces the original information signal.

Shown in FIG. 1 is a greatly simplified example of a typical direct sequence spread spectrum (DSSS) transmitter, generally indicated by the numeral 100. DSSS transmitter 100 receives an information signal 102 in the form of a serial sequence of binary digits. A pseudo-random noise (PSN) generator 104 that is responsible for reliably generating a fixed-length pseudo-random binary sequence known as the spreading code. A logic gate 106 that implements an "exclusive-OR" logic function is adapted to receive and logically process the information signal 102 and the spreading code produced by PSN generator 104. The output of the logic gate 106 is directed to a binary phase shift key (BPSK) modulator 108. BPSK modulator 108 also receives a signal from carrier oscillator 110. The modulated output of BPSK modulator 108 is amplified via RF power amplifier 112 and subsequently broadcast by antenna 114. As such, it will be appreciated that input information signal 102 is logically combined with a spreading code produced by PSN generator 104, and the resulting composite signal is provided as input to BPSK modulator 108. Modulator 108, with the aid of a carrier signal produced by carrier oscillator 110, encodes and modulates the composite signal using a BPSK modulating algorithm. The resulting BPSK modulated output signal is subsequently amplified via RF power amplifier 112 and broadcast from transmitter antenna 114.

FIG. 2 illustrates examples of the initial, intermediate, and final waveforms generated by the DSSS transmitter 100 shown in FIG. 1. More particularly, FIG. 2 includes a sample waveform diagram 150 corresponding to a portion of the input information signal 102. Also included is a sample waveform diagram 152 corresponding to a portion of a spreading code sequence produced by PSN generator 104. Waveform diagram 154 illustrates a sample output of the XOR logic gate 106 corresponding to logical processing of the information waveform 150 and the spreading code waveform 152. Finally, waveform diagram 156 illustrates the broadband, BPSK modulated output signal produced by the BPSK modulator 108.

FIG. 3 illustrates a simplified example of a typical direct sequence spread spectrum (DSSS) receiver, generally indicated by the numeral 120. DSSS receiver 120 includes a receiving antenna 122, a broadband RF amplifier 124, and a first signal mixer 126. Signal mixer 126 is adapted to receive an amplified broadband signal from amplifier 124 as well as a heterodyne frequency (f=fcarrier−f IF) signal generated by a local oscillator 128. The output signal produced by mixer 126 is then compared at a second mixer 130 to another IF signal that is generated by a third mixer 132. The IF signal generated by mixer 132 is produced using the same spreading code sequence as that used by the corresponding DSSS transmitter 100 shown in FIG. 1. This spreading code sequence is generated in much the same manner as described above for transmitter 100. That is, a PSN generator 134 and associated clock function 136 are used to create the binary spreading code sequence. More particularly, the binary spreading code sequence produced by PSN generator 134 is combined with an IF carrier signal that is produced by an IF oscillator 138. It will be further appreciated that signal output by the correlating mixer 130 is used to drive a synchronization circuit 140, which in turn is responsible for insuring that the IF carrier signal generated by oscillator 138 is of the exact frequency and phase necessary for demodulation or "de-spreading" of the received broadband signal. Synchronization circuit 140 performs this function, in part, by altering the frequency of clock source 136 such that the PSN or spreading code chip rate matches that of the incoming modulated broadband signal. Since the spreading code produced by the PSN generator is the same as that contained within the received signal, adjusting the clock in the manner described above will eventually allow the two signals to be brought into a synchronized state.

Again, it will be appreciated that the spreading code produced by PSN generator 134 is used to modulate the IF carrier produced by oscillator 138 at mixer 132. This spreading code modulated IF carrier output of mixer 132 is subsequently provided as one input to the correlating mixer 130. Again, it will be appreciated that the output of mixer 132 is a BPSK modulated signal that is similar to the received broadband signal. This BPSK modulated signal produced by mixer 132 is compared to the received broadband signal in mixer 130, which effectively acts as a correlator. The output of the correlating mixer 130 is then filtered via a low pass filter (LPF) 142 so as to generally recover the original sequence of binary information sent by the transmitter 100.

Returning now to FIG. 1, it will be appreciated that following BPSK modulation, signal 156 is further amplified so as to raise the signal's power to a level that permits effective transmission of the signal over a desired distance. It should be noted and furthermore, is of particular relevance to the invention disclosed herein, that the transmission power level controlled by RF power amplifier 112 is set completely independent of and without any feedback from an associated SS receiver. That is, the transmission power level of DSSS transmitter 100 is set by RF power amplifier 112 with no knowledge of how well or poorly a target DSSS receiver is able to receive and interpret the signal. Such a DSSS communication system relies completely upon human intervention to adjust transmitter power levels as required.

Therefore, what is needed is a spread spectrum type communication system that is capable of automatically adjusting the transmitted power level so as to insure that an optimum transmitted power level is achieved and maintained.

Disclosure of the Invention

According to one aspect, the present invention includes a spread spectrum communications system that is capable of automatically adjusting transmission power level so as to optimize one or more aspects of the spread spectrum communication system performance. The spread spectrum communications system is comprised of a first spread spectrum transmitter, an associated first spread spectrum receiver, and a feedback communication system. The first spread spectrum transmitter is adapted to transmit a spread spectrum type signal. The first spread spectrum receiver is adapted to receive the spread spectrum type signal sent by the first spread spectrum transmitter and to subsequently generate transmission power level control information, which is conveyed to the first spread spectrum transmitter via a feedback communication system. The first spread spectrum transmitter is further adapted to receive and process transmission power level control information that is provided by the feedback communication system, and subsequently adjust transmission power in accordance with the received transmission power level control information.

The present invention obtains reliable connection in systems with automatic regulation of transmitter power (or the transmitted signal) for the purpose of reducing transmitter power depending on the conditions of signal propagation and noise level. This reliable connection is achieved by the adaptation of the system to the specifics of the noise power fluctuations, changes in the conditions of signal propagation, and changes in the noise to signal ratio during the transmission. The present invention achieves this adaptation using a received power level measurement module, a received signal phase fluctuation measurement module, and a received signal minimum necessary power level calculation module. The received power level measurement module is coupled to the output of an RF amplifier, which is coupled to the input of a spread spectrum receiver. The received signal phase fluctuation measurement module is coupled to a receiver clock and a correlator. The received minimum power level calculation circuit is coupled to the outputs of the received signal power level measurement module and the received signal phase fluctuation measurement module.

The functions for providing spread spectrum transmitter power control are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing spread spectrum transmitter power control are illustrated herein as functional blocks within a spread spectrum transmitter or receiver. It is understood that these cards or subsystems include hardware for storing and executing the processes and modules. For example, each of the functional blocks described below may include one or more programmable logic array components, such as an FPGA or CPLD module available from Xilinx, Inc., as well as one or more microprocessors, such as an x86 microprocessor available from Intel Corp., and associated memory.

Accordingly, it is an object of the present invention to provide a spread spectrum communication system wherein for a given transmitter and receiver configuration, the minimum signal transmission power level acceptable for a particular spread spectrum receiver is automatically determined and utilized.

It is yet another object of the present invention to provide a spread spectrum communication system that utilizes a feedback control signal generated by a spread spectrum receiver, so as to control the transmission power level of an associated spread spectrum transmitter.

It is yet another object of the present invention to provide a spread spectrum receiver that is capable of generating a transmission power level control signal that is based, at least in part, on a power level of a received signal.

It is yet another object of the present invention to provide a spread spectrum receiver that is capable of generating a transmission power level control signal that is based, at least in part, on a signal to noise ratio of a received signal.

It is yet another object of the present invention to provide a spread spectrum receiver that is capable of generating a transmission power level control signal that is based, at least in part, on a spreading code and carrier modulation present in a received signal.

Some of the objects of the invention having been stated hereinabove, other objects will become evident as the description proceeds, when taken in connection with the accompanying drawings as best described hereinbelow.

BRIEF DESCRIPTION OF THE DRAWING

A description of preferred embodiments of the present invention will now proceed with reference to the accompanying drawings of which.

DETAILED DESCRIPTION OF THE INVENTION

Disclosed herein are several embodiments of the present invention, all of which include components that perform functions similar to that of a traditional spread spectrum communication systems. In addition to such traditional functionality, a spread spectrum communication system of the present invention generally includes a feedback subsystem that enables an optimum transmitter power level to be achieved and maintained within the communication system.

This feedback can be performed in particular by exchange of data regarding the necessary change of power level between both transmitters in a communication system of the present invention. Such feedback data can be included in a service field along with other supporting information which is ultimately transmitted together with the useful information, thereby avoiding the necessity of a second data transfer channel.

Figure 1:
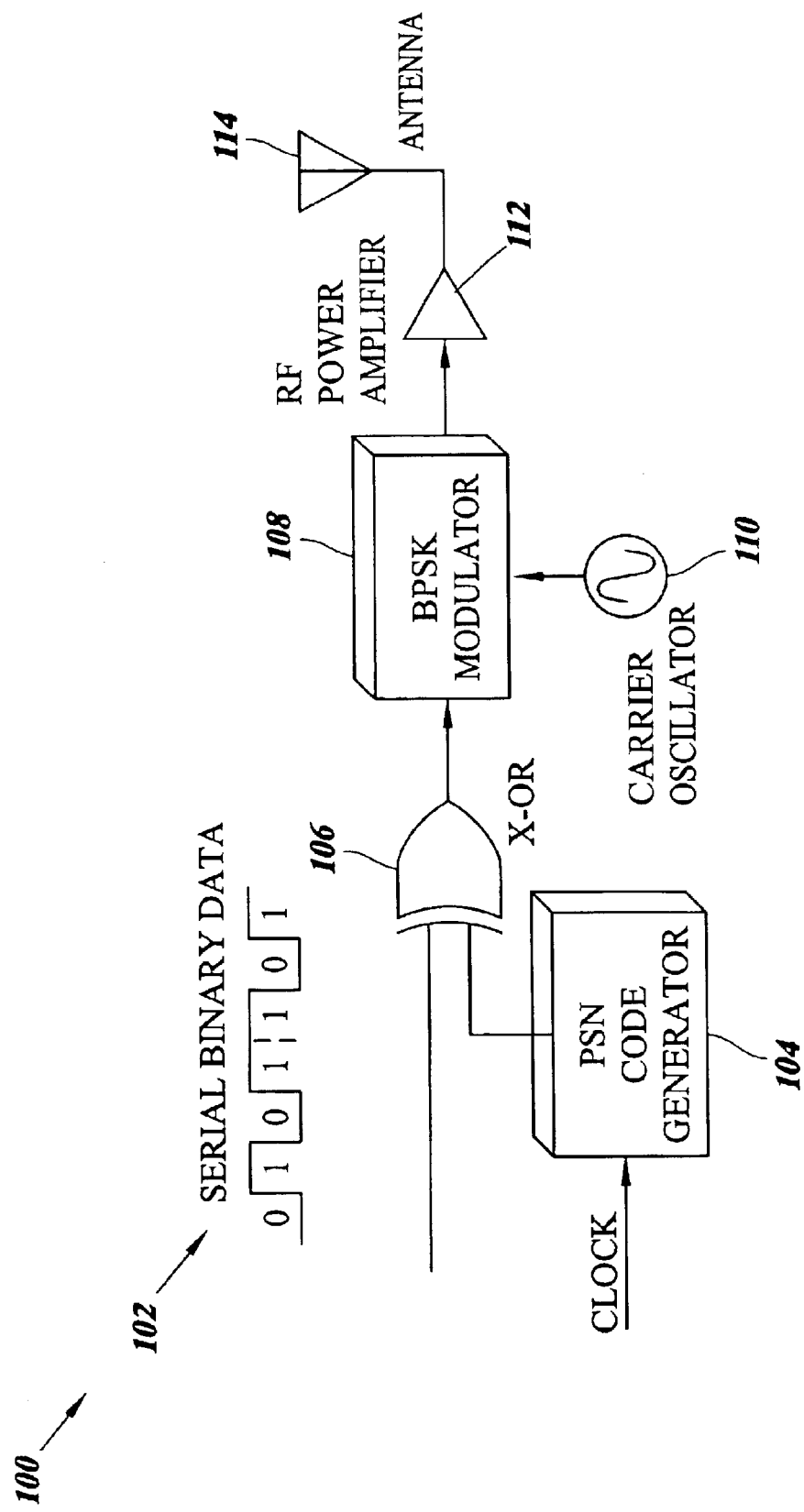
FIG. 1 is a schematic block diagram of a prior art direct sequence spread spectrum (DSSS) transmitter.
Figure 2:
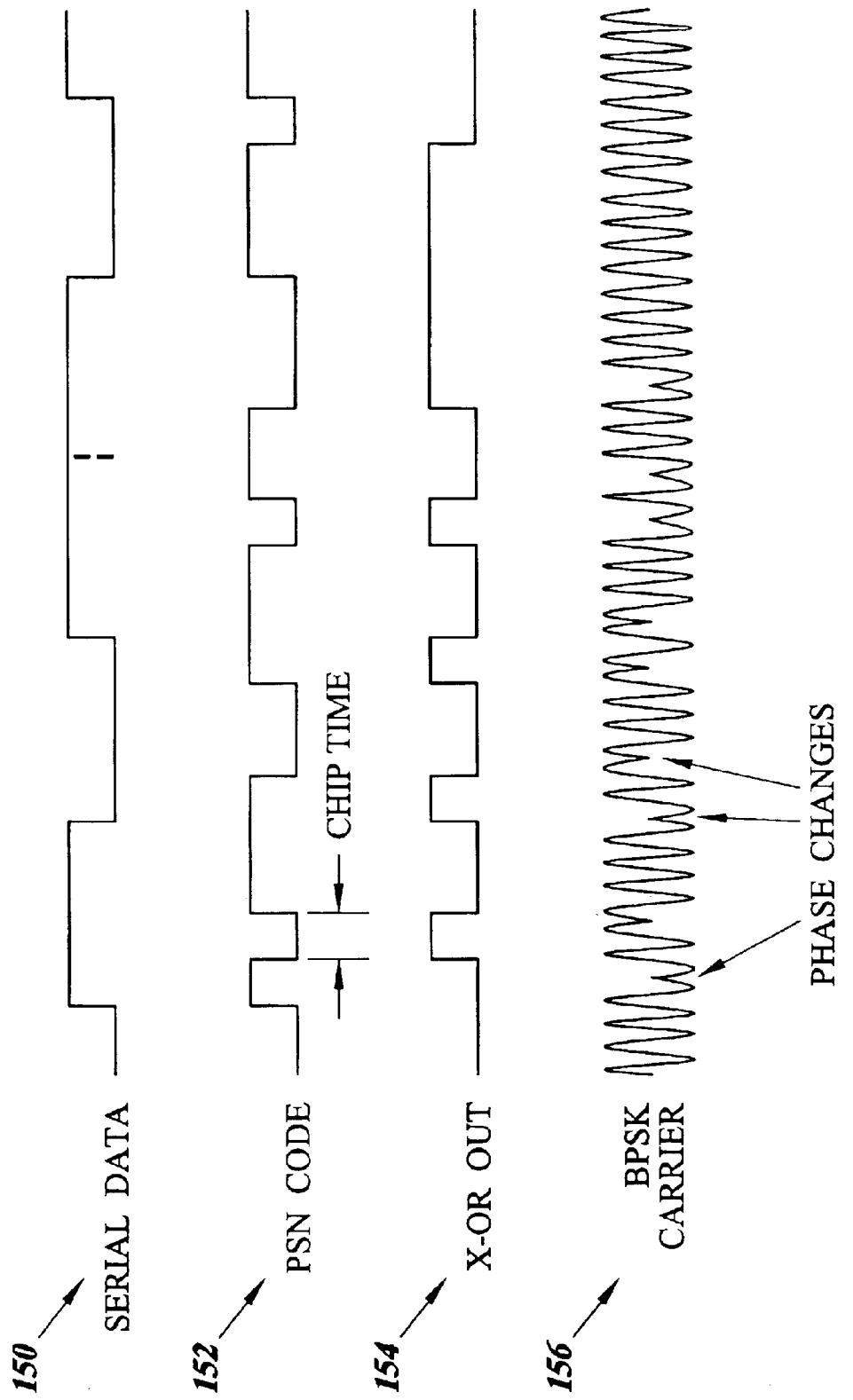
FIG. 2 includes a series of waveform diagrams that illustrate typical encoding and modulation techniques employed in a DSSS communications system.
Figure 3:
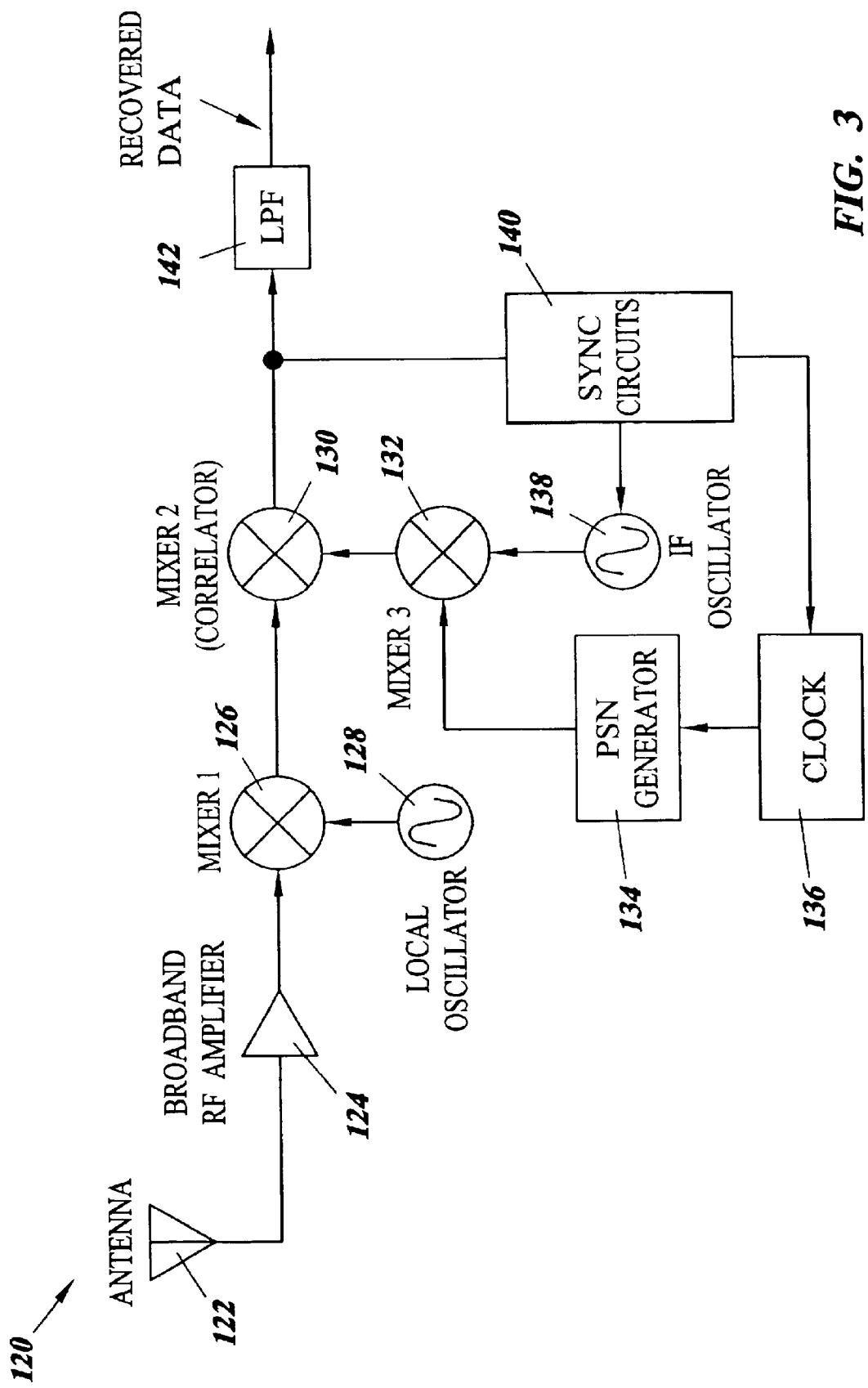
FIG. 3 is a schematic block diagram illustrating the basic functional components of a prior art DSSS receiver.
Figure 4:
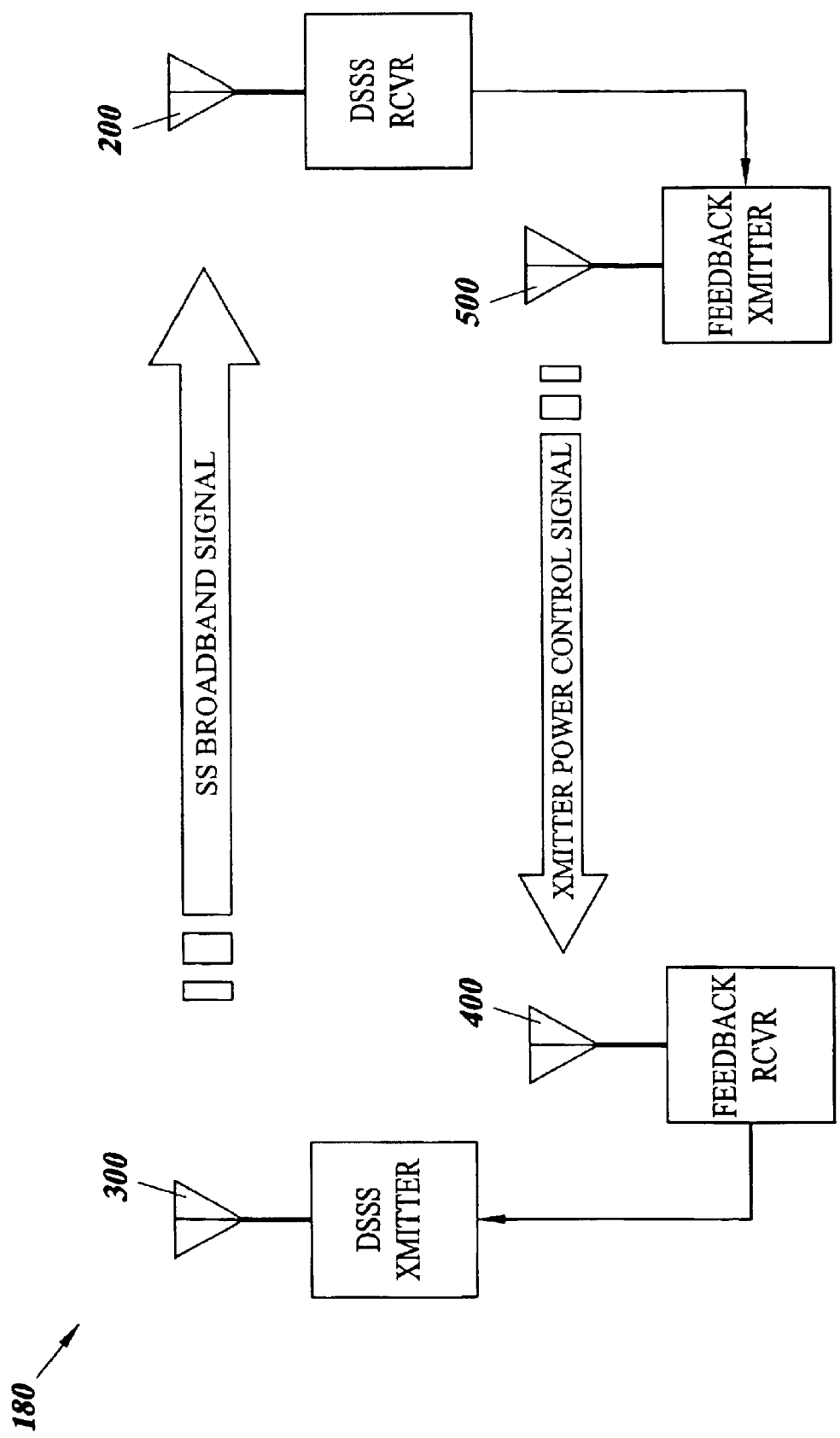
FIG. 4 is a simplified schematic block diagram of a DSSS communication system according to an embodiment of the present invention.

FIG. 4 illustrates one embodiment of a DSSS communication system of the present invention, generally indicated by the numeral 180. DSSS system 180 includes a first receiver 200 and a corresponding first transmitter 300, as well as a second receiver 400 and a corresponding second transmitter 500. It will be appreciated from FIG. 4 that the transmission and subsequent reception of a broadband information signal by transmitter 300 and receiver 200, respectively, results in the generation of a power level control signal at the receiver 200 that is based on certain characteristics of the received broadband information signal. This power level control signal is subsequently fed or relayed back to the transmitter 300 via the second transmitter and receiver pair, where it is used to adjust the output or transmit power level of the first transmitter 300. In a preferred embodiment, the power level control signal generated by receiver 200 is configured so as to adjust the output power of the first transmitter 300 towards the minimum power level necessary for reliable communication of information between the first transmitter and receiver pair.

Although the communication system 180 shown in FIG. 4 presents each of the transmitting and receiving components as discrete or separate units, it will be appreciated that transmitter 300 and feedback receiver 400 could be integrally combined so as to effectively form a first communications transceiver module. In a similar manner receiver 200 and feedback transmitter 500 could be integrally combined so as to effectively form a second communications transceiver module. It will also be appreciated that the feedback transmitter and receiver pair need not necessarily employ a spread spectrum communication technique. Finally, although embodiments of the present invention will be explained in terms of a transmitter and a receiver with regard to the spread spectrum data signal, it is understood that spread spectrum transmitter 300 can include spread spectrum signal receiving capabilities and spread spectrum receiver 200 can include spread spectrum transmitting capabilities to form a spread spectrum transceiver pair. In such an embodiment, both sides may include a received signal minimum necessary power level calculation circuit for producing a signal for adjusting the transmitted power from the other side. The internal details and interworkings of such an exemplary received signal minimum necessary power level calculation circuit will be discussed in more detail below.

Power Level Control Signal Theoretical Foundation

The basis of the power level control signal computation involves a unique property of spread spectrum communication systems. As discussed previously, signals generated using spread spectrum techniques appear as noise in the frequency domain. The wide bandwidth provided by the spreading code effectively allows the transmitted signal power to drop below the noise threshold without loss of information. The power level control signal computation algorithm implemented in a DSSS receiver of the present invention capitalizes on this key characteristic of spread spectrum transmissions. More particularly, it will be appreciated by those skilled in the art that true random noise exhibits a uniform instantaneous power spectral density ($P_n$) distribution over a given area of bandwidth. It will be recalled from the discussions presented above that an information signal is "spread" using a pseudo-noise type code, and, as such, the information signal instantaneous power density ($P_s$) exhibits this same uniform distribution characteristic. From a practical standpoint, it will be appreciated that a signal received at a spread spectrum receiver will typically contain both a true noise component and an information component. As such, the total received instantaneous signal power ($P_{sum}$) can be expressed mathematically as the sum of the true noise and information signal power density components:

$$P_{sum}=P_n+P_s.$$

Figure 5:
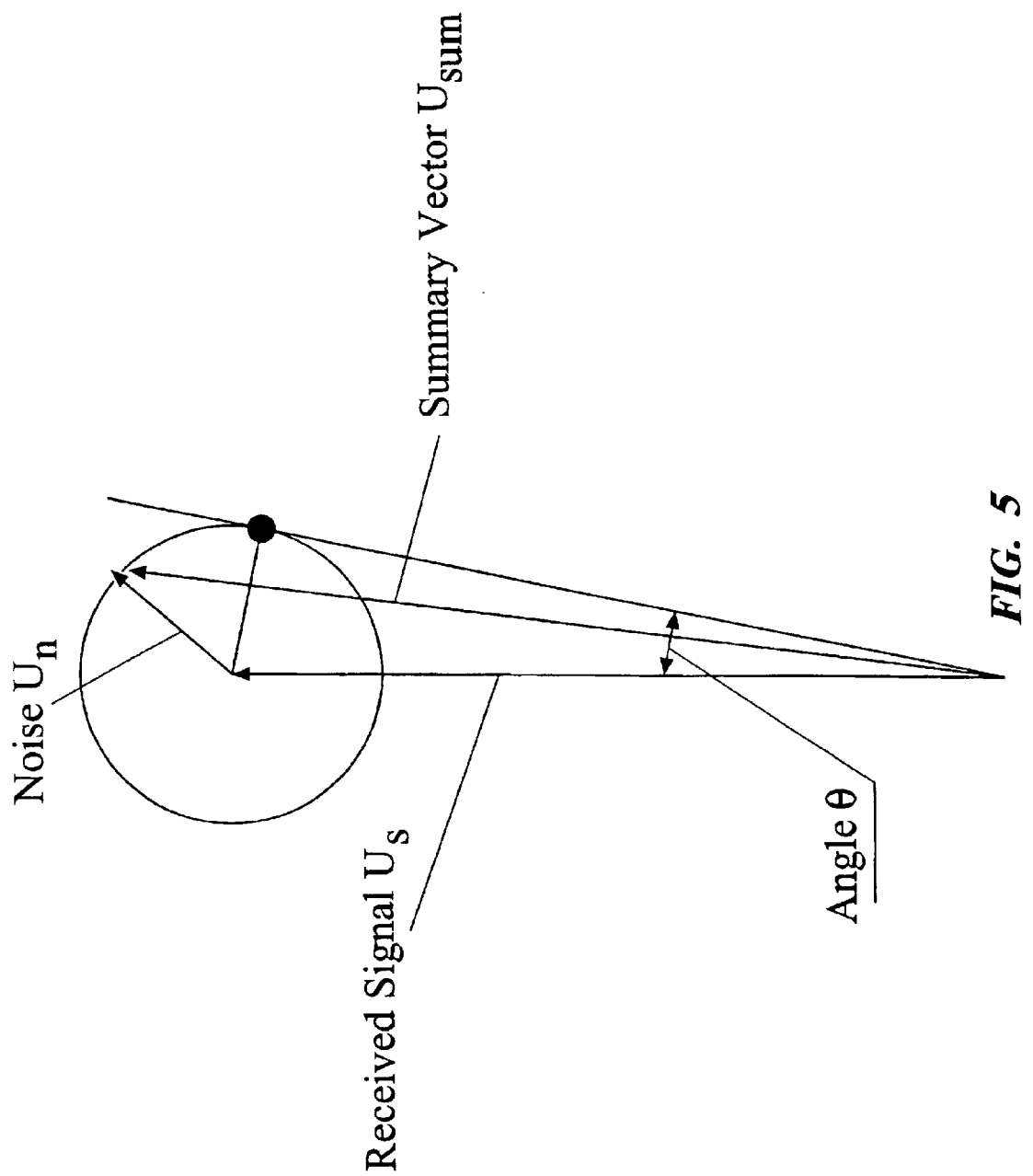
FIG. 5 is a vector diagram illustrating the relationship between various components of a spread spectrum received signal.

The above relationship is graphically illustrated in the vector diagram presented in FIG. 5. FIG. 5 is in polar coordinates. In FIG. 5, $U_s$ represents the signal voltage vector, $U_n$ represents the noise voltage vector, and $U_{sum}$ represents the sum of the signal and noise voltage vectors.

Without presenting a detailed mathematical derivation, it will be further appreciated that the ratio of true noise power density to information signal power density ($P_n/P_s$) can be expressed as $\sin^2(\theta)$.

$\theta$ is defined as a phase fluctuation angle associated with the information signal. From the expression derived above, it follows that:

$$P_n=P_s*\sin^2(\theta).$$

If it is assumed that $\theta_{max}$ represents the maximum degree of phase fluctuation that can be tolerated and still result in reliable information signal reception and recovery, then the ratio of true noise power density ($P_n$) to the minimum receivable information signal power ($P_{s-min}$) can be expressed as $\sin^2(\theta_{max})$. That is:

$$P_n/P_{s-min}=\sin^2(\theta_{max}).$$

From FIG. 5 it will be appreciated that $P_n/P_s=\sin^2(\theta)$ and $P_{n-max}/P_s=\sin^2(\theta_{max})$. Where, $P_{n-max}$ is the maximum instantaneous power of signal noise. Hence, $\sin^2(\theta)/\sin^2(\theta_{max})=(P_n/P_s)/(P_{n-max}/P_s)=P_n/P_{n-max}$. It therefore follows that $P_{s-min}/P_n=P_s/P_{n-max}$, since the minimum allowed signal to noise ratio at the point of measure is considered constant in a broad power range.

Using the equations derived above, it will be appreciated that an expression relating the minimum receivable information signal power ($P_{s-min}$) to the actual received information signal power ($P_s$) can be realized. More particularly:

$$P_{s-min}/P_s=\sin^2(\theta)/\sin^2(\theta_{max});$$

and it is this ratio of $P_{s-min}$ to $P_s$ that comprises the power level control feedback signal which is employed in the communication system of the present invention. Implementation of the above stated algorithm that defines this, ratio of $P_{s-min}$ to $P_s$, and consequently the power level control feedback signal, is discussed in detail below.

DSSS System Basic Architecture

Figure 6:
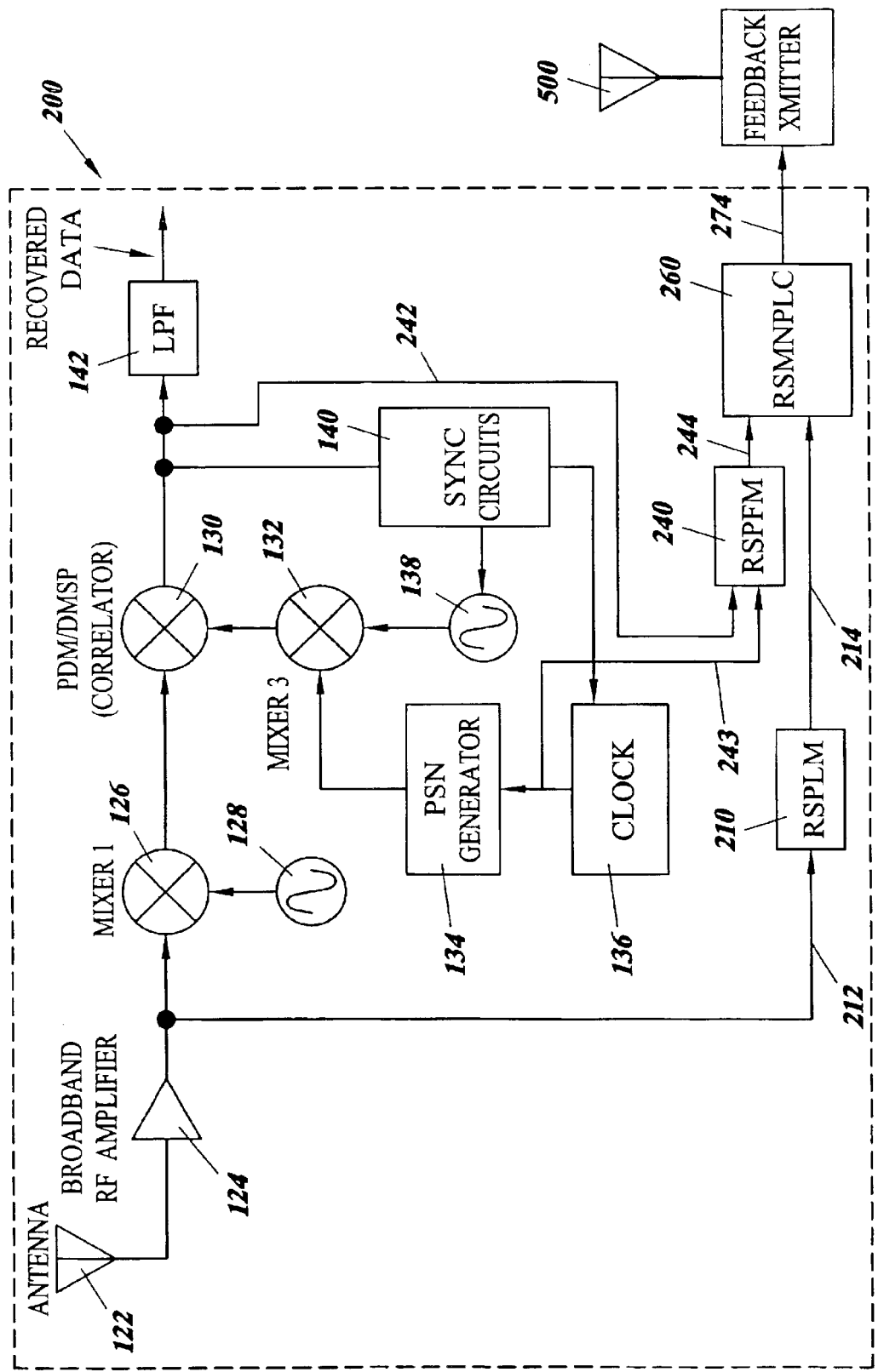
FIG. 6 is a schematic block diagram of a DSSS receiver of the present invention that includes modules for generating a power level control feedback signal.

FIG. 6 is a block diagram that generally illustrates the base internal architecture of one embodiment of a direct sequence spread spectrum (DSSS) receiver, generally indicated by the numeral 200. DSSS receiver 200 includes a receiving antenna 122, a broadband RF amplifier 124, and a first signal mixer 126. Signal mixer 126 is adapted to receive an amplified broadband signal from amplifier 124 as well as a heterodyne frequency (f=fcarrier−f IF) signal generated by a local oscillator 128.

The output signal produced by mixer 126 is then compared at a second mixer or correlator 130 to another IF signal that is generated by a third mixer 132. The IF signal generated by mixer 132 is produced using the same spreading code sequence as that used by the corresponding or matching DSSS transmitter 300. This spreading code sequence is generated by a PSN generator 134 and an associated clock function 136. More particularly, the binary spreading code sequence produced by PSN generator 134 is combined with an IF carrier signal that is produced by an IF oscillator 138.

It will be further appreciated that signal output by the correlating mixer 130 is used to drive a synchronization circuit 140, which in turn is responsible for insuring that the IF carrier signal generated by oscillator 138 is of the exact frequency and phase necessary for demodulation or "despreading" of the received broadband signal. Synchronization circuit 140 performs this function, in part, by altering the frequency of clock source 136 such that the PSN or spreading code chip rate matches that of the incoming modulated broadband signal. Since the spreading code produced by the PSN generator is the same as that contained within the received signal, adjusting the clock in the manner described above will eventually allow the two signals to be brought into a synchronized state.

It will be appreciated that the spreading code produced by PSN generator 134 is used to modulate the IF carrier produced by oscillator 138 at mixer 132. This spreading code modulated IF carrier output of mixer 132 is subsequently provided as one input to the correlating mixer 130. As discussed briefly above, the output of mixer 132 is a BPSK modulated signal that is similar to the received broadband signal. This BPSK modulated signal produced by mixer 132 is compared to the received broadband signal in mixer 130, which effectively acts as a correlator. Those skilled in the art of spread spectrum communication systems will appreciate that the correlating mixer 130 might include phase demodulating and demodulated signal processing functionality. In any event, the output of the correlating mixer 130 is then filtered via a Low Pass Filter (LPF) 142 so as to generally recover the original sequence of binary information sent by the first transmitter 300.

Figure 7:
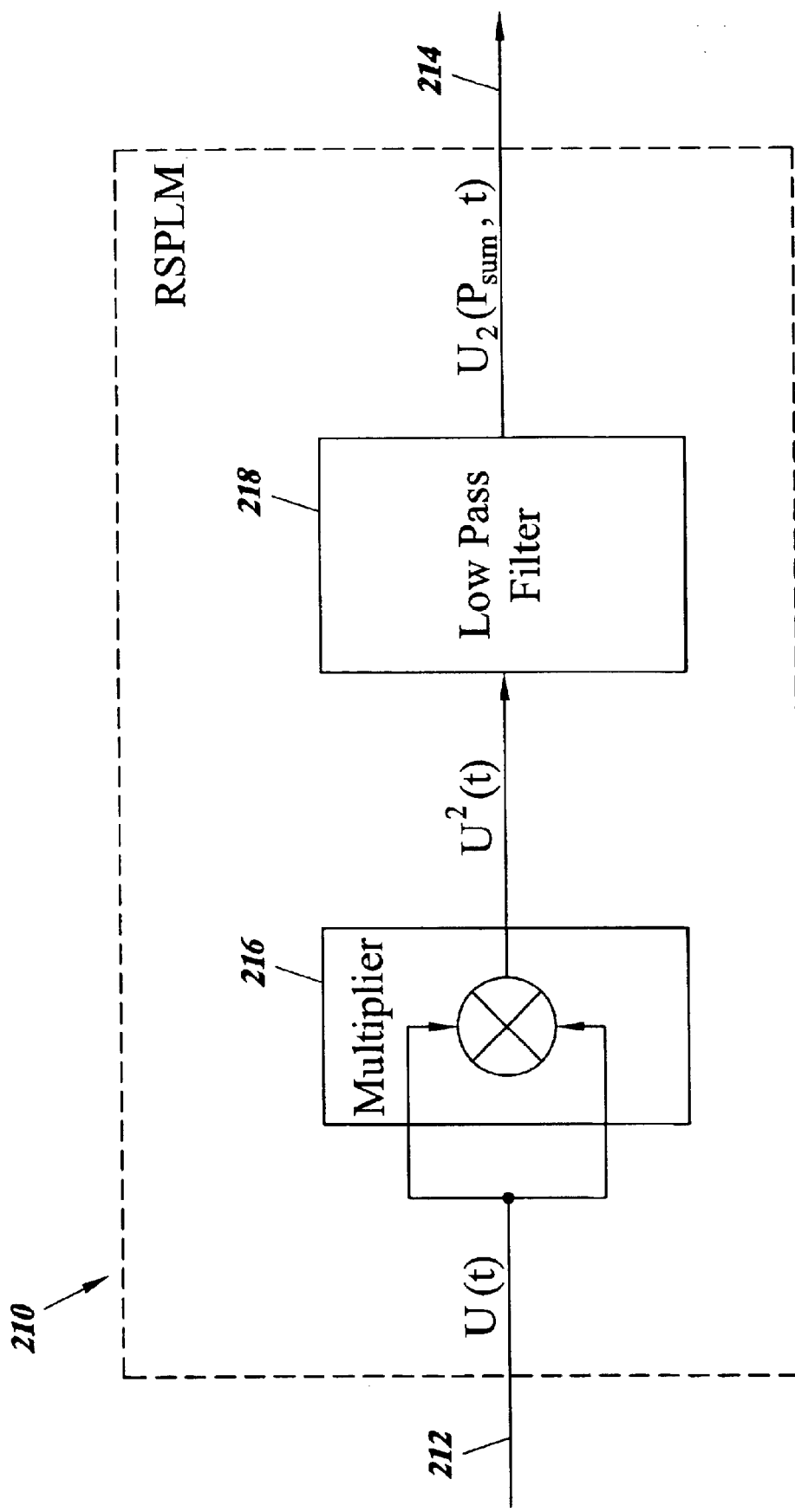
FIG. 7 is a schematic block diagram of a received signal power level measurement (RSPLM) module according to an embodiment of the present invention.

Of particular significance to the present invention are the three modules identified as received signal power level measurement (RSPLM) module 210, received signal phase fluctuation measurement (RSPFM) module 240, and received signal minimum necessary power level calculation (RSMNPLC) module 260. RSPLM module 210 is configured so as to receive as input an amplified form of a received broadband signal from amplifier 124. As indicated in FIG. 6, this amplified signal is provided to RSPLM module 210 via a communication pathway or connection 212. Presented in FIG. 7 is a detailed schematic diagram of one embodiment of RSPLM module 210. RSPLM 210 is adapted to receive, as input, the amplified broadband signal 212 and subsequently generate an output signal that is proportional to the power level of the input signal.

FIG. 7 is a block diagram illustrating internal details of RSPLM module 210. As shown in FIG. 7, RSPLM module 210 includes a multiplier 216 and a low pass filter 218. Multiplier 216 is configured so as to take as input the broadband signal received over connection 212 and effectively output a signal that is the mathematical square of this input signal. The squared output signal is subsequently subjected to the low pass filter 218, with the passed signal component being output from the RSPLM module as output signal $U_2$ ($P_{sum}$, t). It will be appreciated that signal $U_2$ ($P_{sum}$, t) is proportional to the power level of the received user data signal. More particularly, the signal $U_2$ ($P_{sum}$, t) represents a voltage proportional to the total power of the received signal, which includes the useful signal, noise of the transmission medium, including active interference and noise produced by input devices.

It will be appreciated, by those skilled in the art, that the power level measurement function performed by RSPLM module 210 can be implemented using a variety of architectures other than that specifically shown in FIG. 7. Furthermore, RSPLM module 210 could be implemented in hardware, software, firmware, or a combination thereof.

Referring back to FIG. 6, RSPFM module 240 is configured so as to receive as input a phase demodulated and "de-spread" received signal after processing by the correlating mixer 130. With regard to the phase demodulated and "de-spread" received signal, it will be appreciated that following processing by correlating mixer 130, such a recovered signal ideally directly reflects the information or payload component of the broadband signal originally transmitted by transmitter 300. This recovered information signal is provided to RSPFM module 240 via a communication pathway or connection 242, as indicated in FIG. 6. Received signal phase fluctuation measurement module 240 also receives the clock signal output from clock module 136 via connection 243.

Figure 8:
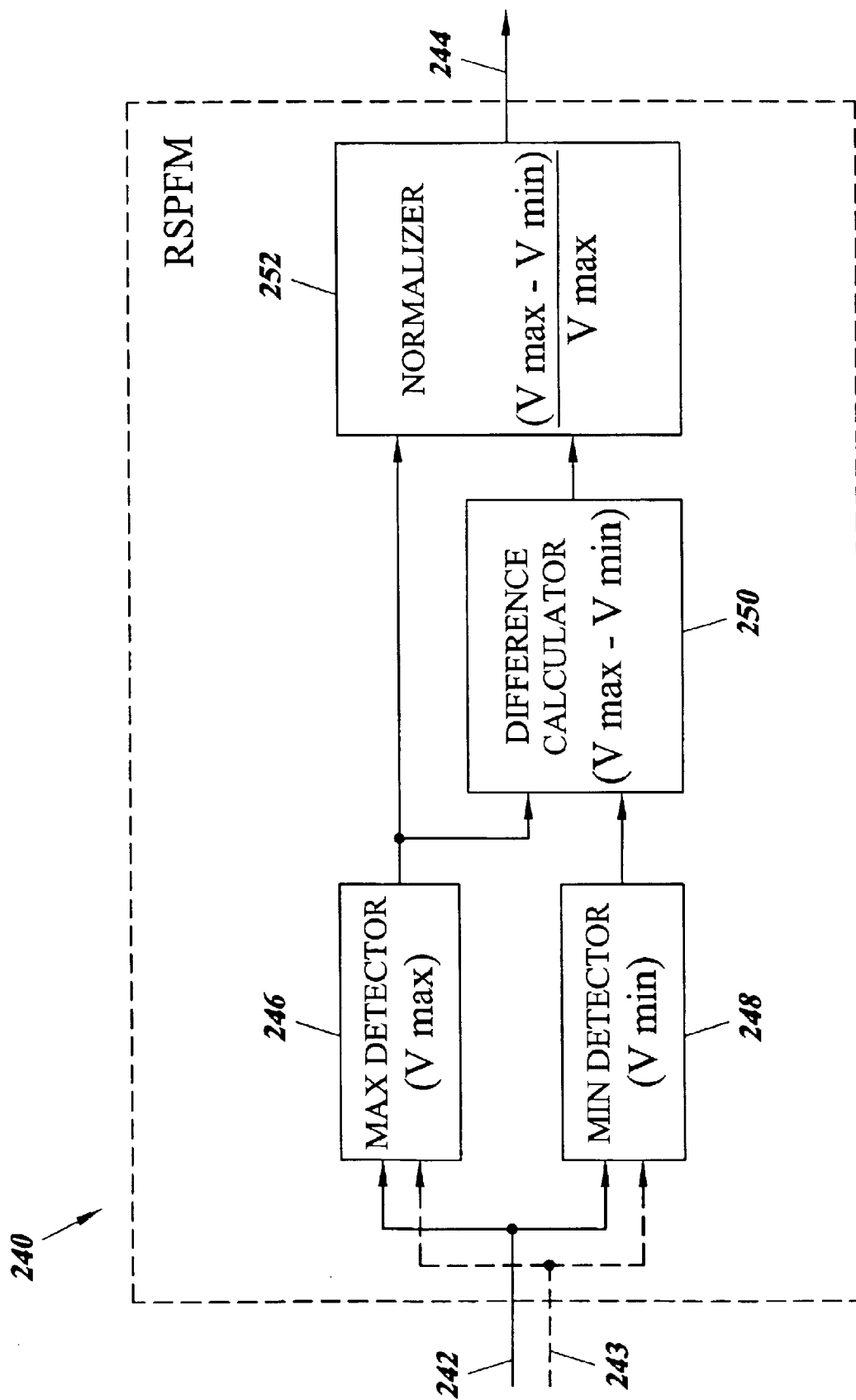
FIG. 8 is a schematic block diagram of a received signal phase fluctuation measurement (RSPFM) module according to an embodiment of the present invention.

FIG. 8 is a detailed schematic diagram of one embodiment of RSPFM module 240. As shown in FIG. 8, RSPFM module 240 includes a maximum signal voltage level measurement module 246, a minimum signal voltage level measurement module 248, a signal voltage level difference calculation module 250, and a signal voltage level normalizer 252. From the schematic presented in FIG. 8, it will be appreciated that the minimum and maximum signal level measurement modules 248 and 246, respectively, are adapted to receive the phase demodulated and "de-spread" received signal after processing by the correlating mixer 130 via signal connection 242 and the clock signal output from the clock module 136 via connection 243. As such, maximum signal level measurement module 246 analyzes the input signal over intervals determined by the clock signal received over connection 243 which corresponds the chip sequence frequency, and subsequently produces an output signal that is representative of the absolute maximum voltage level of the same input signal ($V_{max}$) over the defined interval.

In a similar manner, absolute minimum signal level measurement module 248 analyzes the input signal over intervals determined by the clock signal received over connection 243 which corresponds to the chip sequence frequency, and subsequently produces an output signal that is representative of the average minimum voltage level of the input signal ($V_{min}$).

Figure 9A:
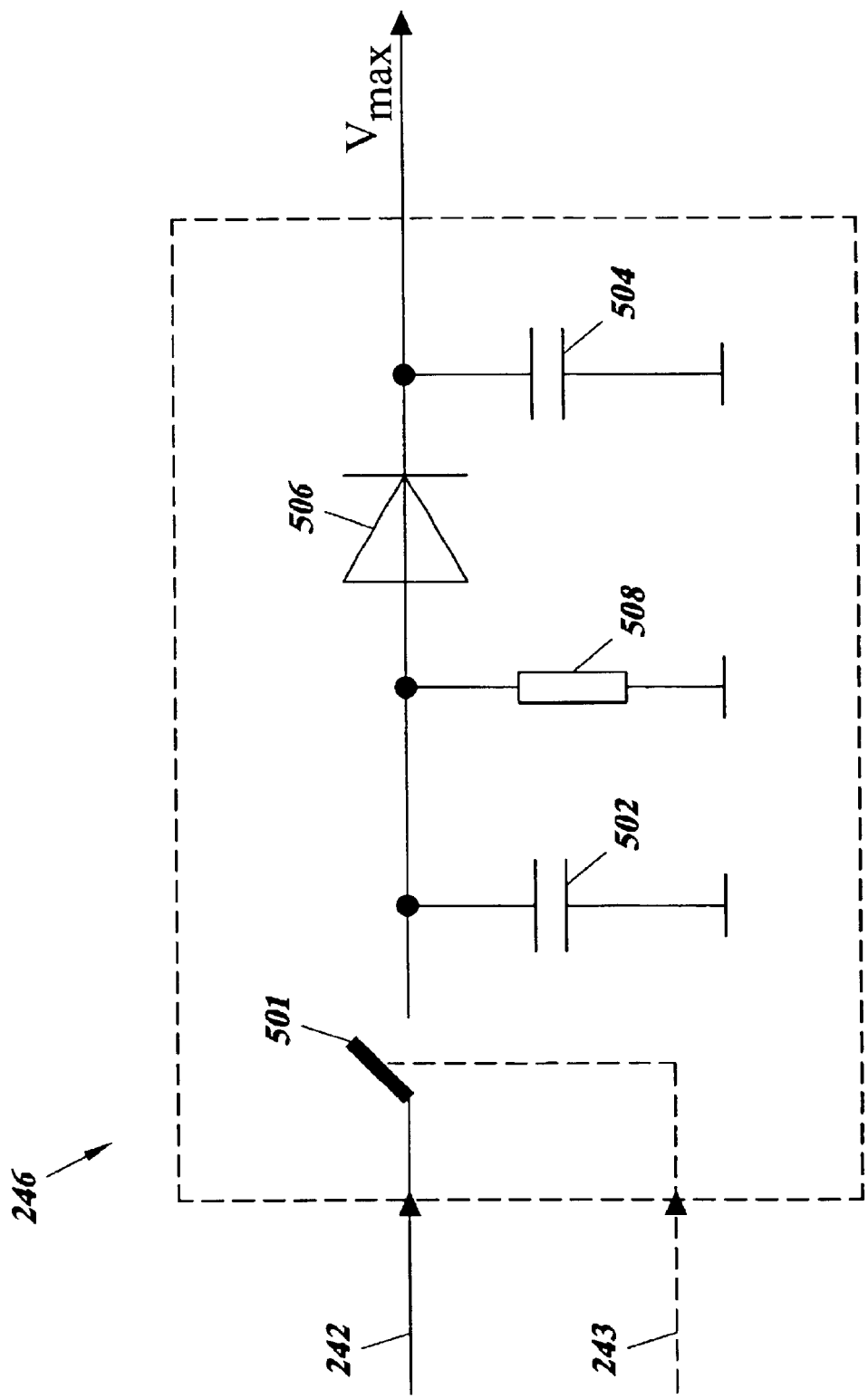
FIG. 9a is a schematic block diagram of a maximum voltage detecting circuit associated with the RSPFM module of FIG. 8.

Shown in FIG. 9a is one embodiment of maximum signal voltage level measurement module 246. Module 246 includes a voltage controlled switch 501, a first capacitor 502, a second capacitor 504, a diode 506, and a resistor 508. The output of this circuit is a signal representative of the maximum amplitude of input signal received over connection 242. For example, when switch 501 closes in response to the clock signal received over connection 243, a filtered version of input signal received over connection 242 is applied to the input terminal of diode 506. Diode 506 passes the positive portion of the filtered input signal and charges capacitor 504 to the maximum level of the input signal. Accordingly, the signal $V_{max}$ has a level equal to the maximum level of the input signal received over connection 242.

Figure 9B:
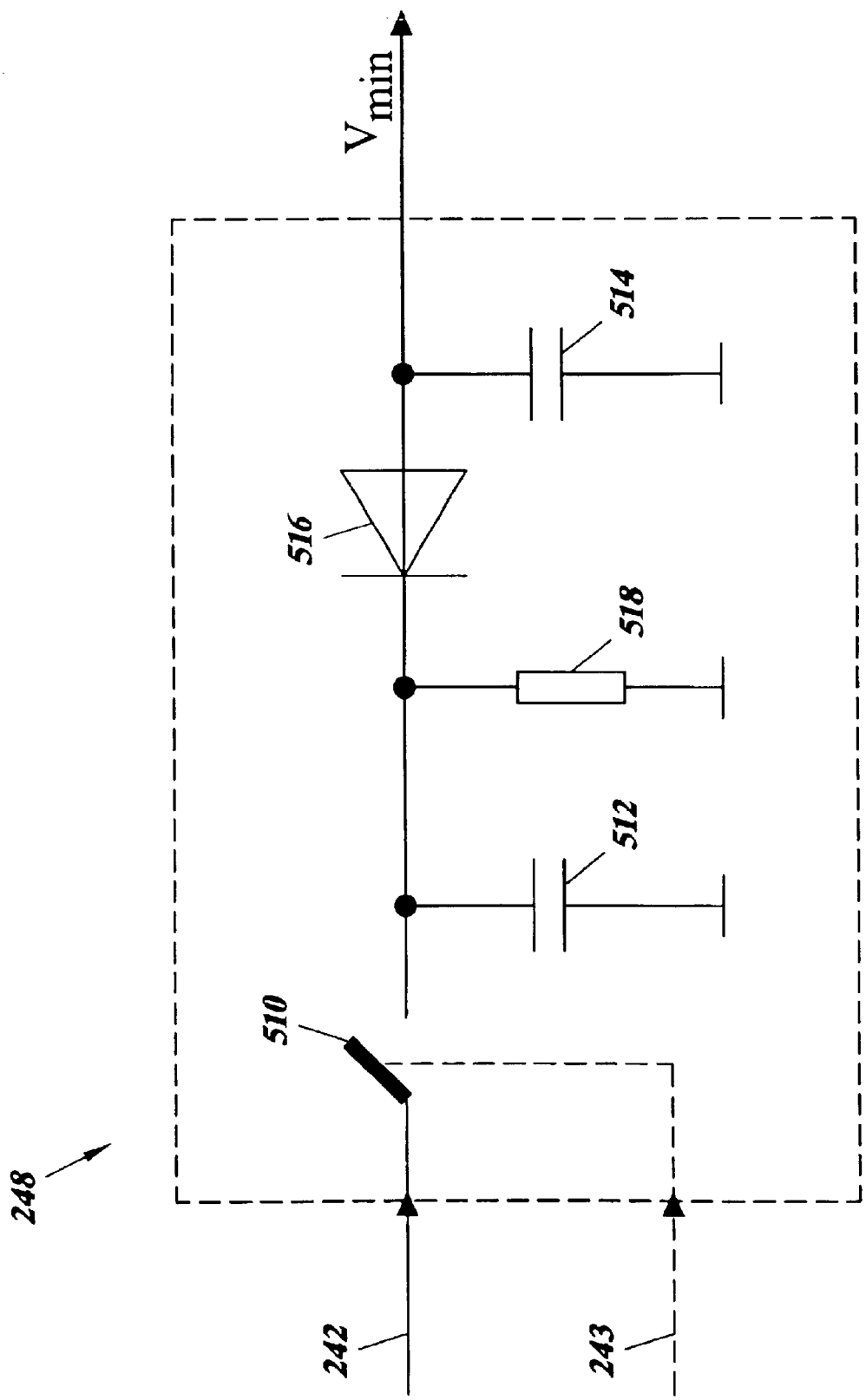
FIG. 9b is a schematic block diagram of a minimum voltage detecting circuit associated with the RSPFM module of FIG. 8.

Shown in FIG. 9b is one embodiment of the minimum signal voltage level measurement module 248. Module 248 includes a voltage controlled switch 510, a first capacitor 512, a second capacitor 514, a diode 516, and a resistor 518. The output of this circuit is a signal representative of the minimum amplitude of the input signal received over connection 242. For example, when switch 510 closes in response to the clock signal received over connection 243 a current is produced through diode 516 only when the voltage level of the input signal received over connection 242 is lower than the voltage level of the output node. Current flowing from ground to diode 516 through capacitor 514 charges capacitor 514. This charge is proportional to the minimum received voltage $V_{min}$.

Figure 9C:
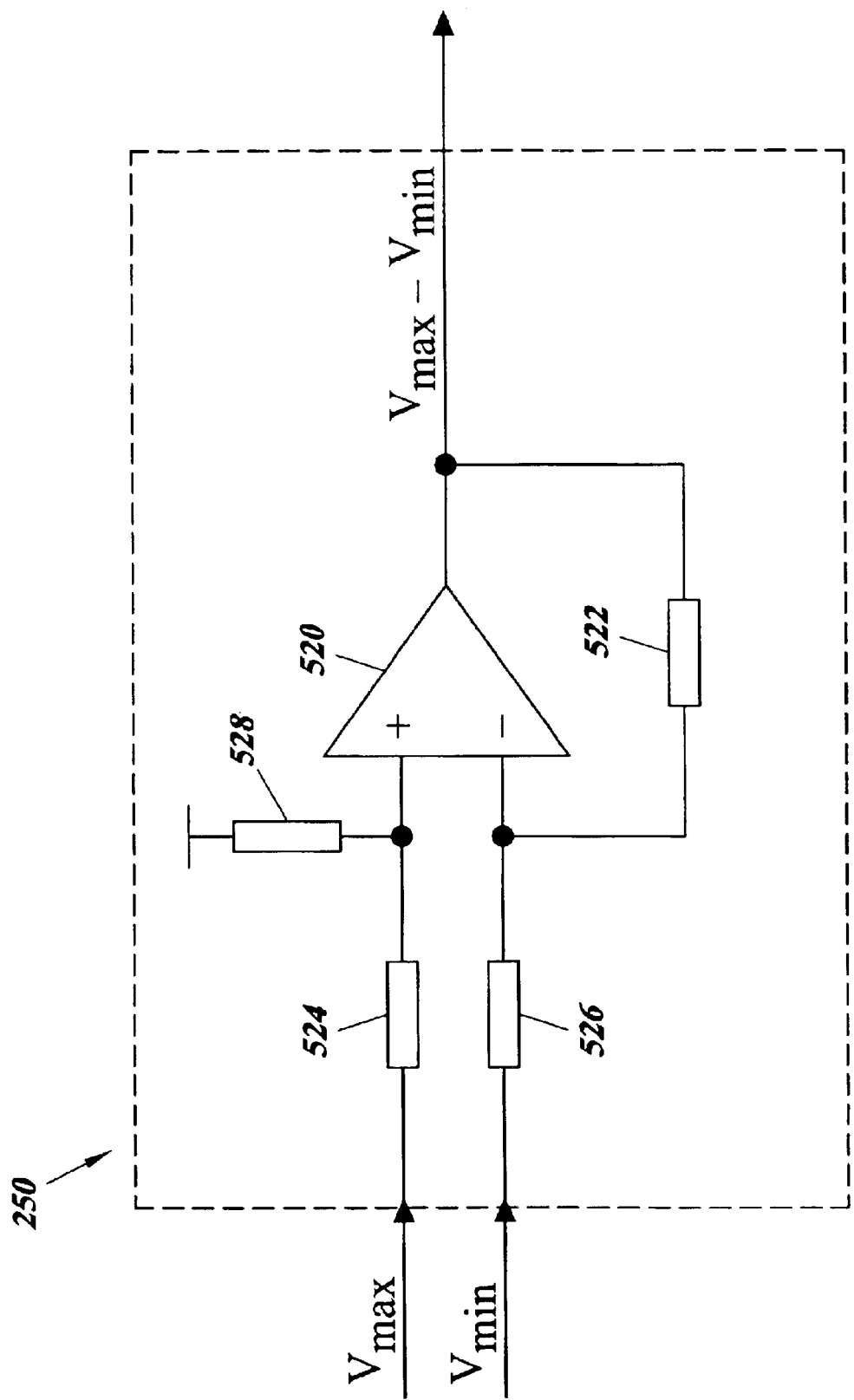
FIG. 9c is a schematic block diagram of a voltage difference calculating circuit associated with the RSPFM module of FIG. 8.

Referring back to FIG. 8, the output signals produced by the maximum and minimum voltage level detectors 246 and 248, respectively, are provided as input to the signal voltage level difference calculation module 250. As the name implies, difference calculation process 250 generates an output signal that is proportional to the difference in magnitudes of maximum and minimum signal voltage levels ($V_{max}$–$V_{min}$). FIG. 9c illustrates an example of voltage difference calculation module 250. Referring to FIG. 9c, voltage difference module 250 comprises a differential amplifier configured to produce an output signal proportional to the difference between the voltages at the inverting and noninverting input terminals. In the illustrated embodiment, the differential amplifier circuit includes an operational amplifier 520 with a feedback resistor 522 and input resistors 524, 526, and 528. The output voltage of such a circuit is given by the following expression:

$$V_0 = \left(\frac{R_{526} + R_{522}}{R_{524} + R_{528}}\right)\frac{R_{528}}{R_{526}} V_{max} - \frac{R_{522}}{R_{526}} V_{min}, \quad (1)$$

where the resistor subscripts in Equation 1 correspond to the resistor numbers in FIG. 9C. Thus, from expression (1), it is apparent that module 250 produces a signal that is proportional to the difference between the maximum and minimum voltage levels of the received signal in case when all of the resistors are equal to each other.

Figure 9D:
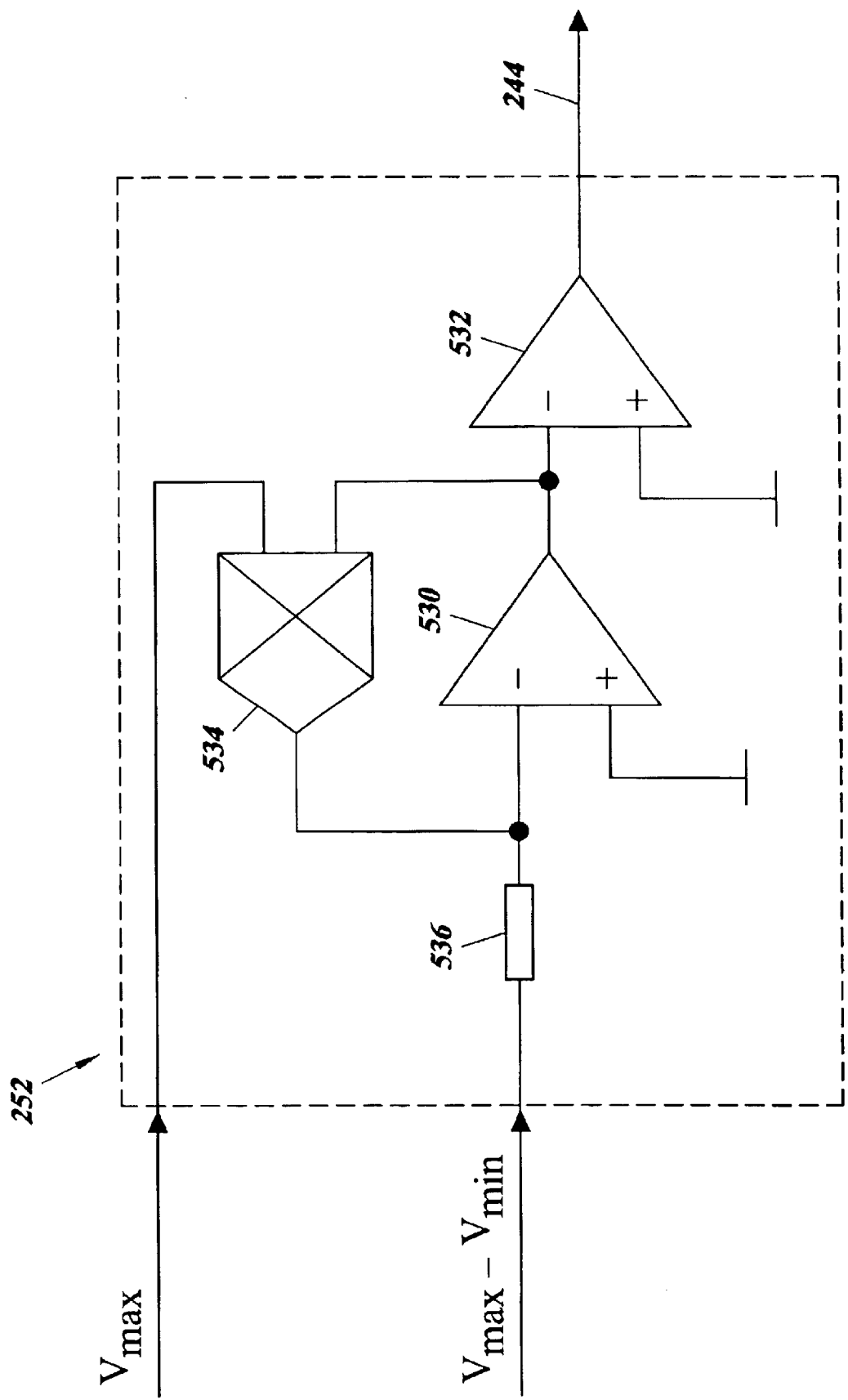
FIG. 9d is a schematic block diagram of a signal normalization circuit associated with the RSPFM module of FIG. 8.

Referring back to FIG. 8, it will be appreciated that the output signals from both the maximum signal level measurement module 246 and the signal voltage level difference calculation process 250 are provided as inputs to the signal voltage level normalizer module 252. Normalizer module 252 normalizes the difference input signal with respect to the maximum voltage level input signal. FIG. 9d is a block diagram of an exemplary normalizer module according to an embodiment of the present invention. In FIG. 9d, normalizer module 252 includes first and second operational amplifiers 530 and 532, multiplier 534, and inputer resistor 536. The equation for the output signal of normalizer module 252 is $$\frac{V_{max} - V_{min}}{V_{max}},$$

assuming that operational amplifiers 530 and 532 are ideal. Accordingly, normalizer module 252 produces a signal that is proportional to the normalized difference between the maximum and minimum values of the demodulated spread spectrum signal over the defined interval.

It will be appreciated by those skilled in the art that the phase fluctuation measurement function performed by RSPFM module 240 can be implemented using a variety of architectures other than that specifically shown in FIG. 8. Furthermore, RSPFM module 240 could be implemented in hardware, software, firmware, or a combination thereof.

Figure 10:
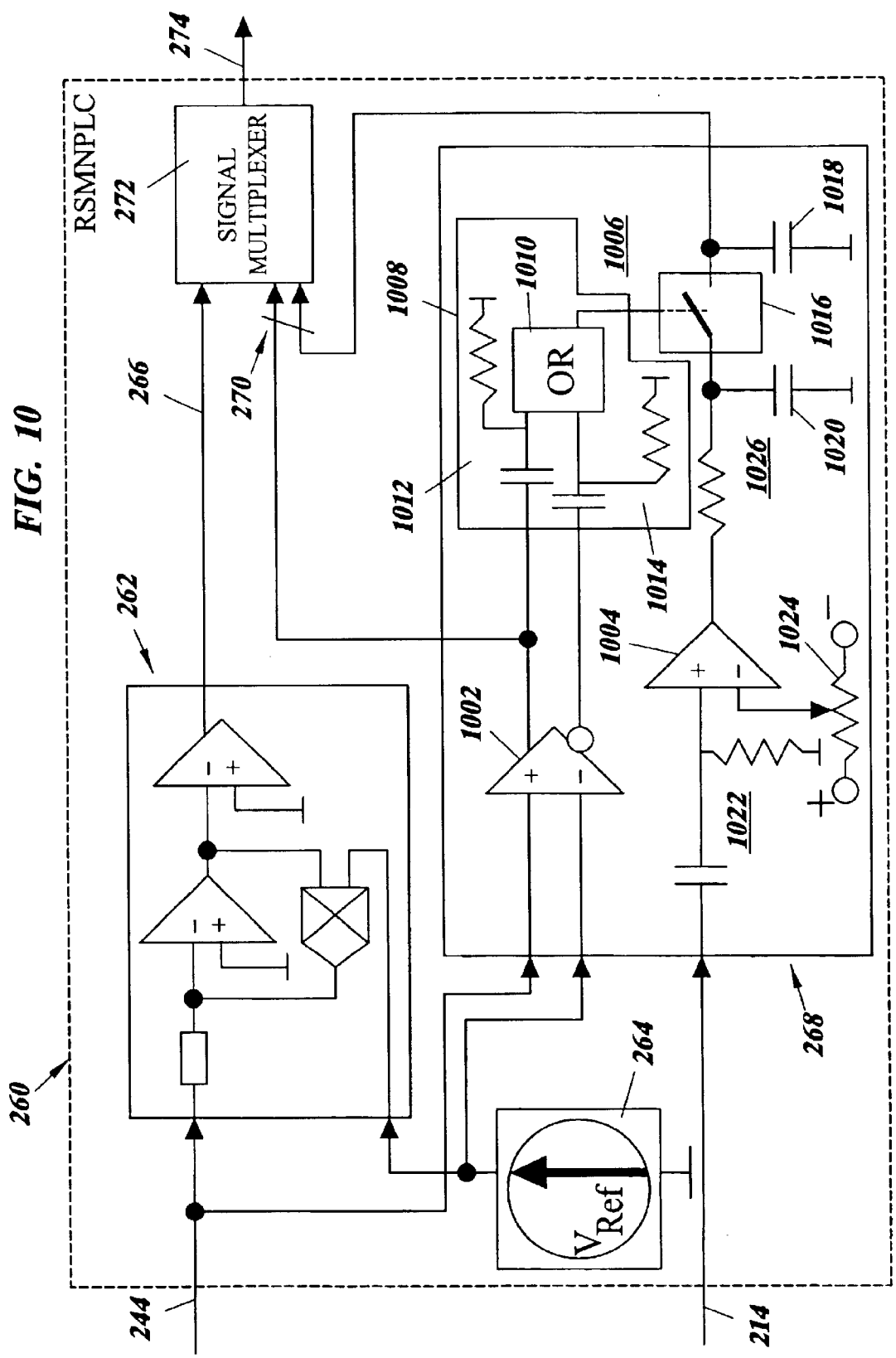
FIG. 10 is a schematic block diagram of a received signal minimum necessary power level calculation (RSMNPLC) module according to an embodiment of the present invention.

Returning now to FIG. 6, it will be appreciated that RSMNPLC module 260 is configured so as to receive input signals from both RSPLM module 210 and RSPFM module 240 via connections 214 and 244, respectively. FIG. 10 is a block diagram of an exemplary configuration for RSMN-PLC module 260 according to an embodiment of the present invention.

In FIG. 10, RSMNPLC module 260 includes a reference voltage normalizer module 262, which is similar in operation and structure to normalizer 252 illustrated with respect to FIG. 9d. Accordingly, it will be appreciated that reference voltage normalizer module 262 produces an output signal based on the output signal from normalizer 252 and a reference voltage $V_{ref}$ output from reference voltage generator 264. The value of $V_{ref}$ is selected based on the maximum allowed value of the signal to noise ratio, which depends on the noise resistance of the given modulation and coding techniques.

Operation module 268 produces a code on bus 270 for controlling the mode of operation of feedback transmitter 500. One of possible implementations of the module 268, where code 270 is formed includes comparators 1002 and 1004, a sample-and-hold (SH) circuit 1006, and a sample-and-hold control signal formation circuit (SH CSF) 1008 including an OR gate 1010 and differentiating circuits 1012 and 1014.

As shown in FIG. 10, and discussed above, the signal produced by the RSPFM module and input to RSMNPLC module 260 via connection 244 is the equivalent of $\sin^2(\theta)$, which is the ratio of true noise power density to information signal power density ($P_n/P_s$). Where again, $\theta$ is defined as a phase fluctuation angle associated with the information signal. The input signal produced by RSPLM module 210 received via connection 214 is referred to as $P_{sum}$, and is representative of the power level of the received user data or information signal.

The input signal received from connection 244 is directed to reference voltage normalizer 262, along with a reference voltage signal, $V_{Ref}$, from the reference voltage source 264. Reference voltage normalizer 262 subsequently produces an output signal 266 which can be expressed as $\sin^2(\theta)/\sin^2(\theta_{max})$. Hence, the output signal on connection 266 is calculated as the ratio of the input signal $\sin^2(\theta)$ to the source of sample power $\sin^2(\theta_{max})$.

With particular regard to the output signal on connection 266, it has been shown above that the expression $\sin^2(\theta)/\sin^2(\theta_{max})$ is essentially equivalent to $P_{s-min}/P_s$. Again, where $P_s$ is the instantaneous signal power and $P_{s-min}$ is defined as the minimum instantaneous acceptable signal power at a given signal noise power level.

In summary, FIG. 10 illustrates module 260, which includes modules 262 (normalizer), 264—the source of the reference voltage corresponding to the maximum allowed value of the noise to signal ratio, which depends on the noise resistance of the given modulation and coding type, and module 268—the operational module which determines the mode of operation of module 500, and module 272 (multiplexer).

Turning now to the signal input via connection 214, it will be appreciated from FIG. 10 that this signal along with a reference voltage signal from reference voltage source 264 and the input signal received via connection 244 are provided as inputs to operational module 268.

The signal received via connection 244 comes to the first input of module 260 from module 240 and corresponds to the signal to noise ratio of the received signal. The first input of module 260 is connected to the input of module 262 (normalizer) and to the second input of module 268 (operational module).

In module 262, the signal received via connection 244 is normalized according to the level of the reference signal coming to the reference signal input of module 262 from module 264. So, in module 262 a signal is formed, the voltage of which corresponds to the ratio of signal received via connection 244 to the signal coming from module 264. The formula of this ratio is $U_2(t) \sim P_{min}/P_s \sim \sin^2\theta/\sin^2\theta_{max}$. The signal output from module 262 is input to multiplexer 272.

The voltage of the signals received via connection 244 and output from reference voltage generator 264 are compared by comparator 1002. The voltage from the non-inverting and inverting outputs of comparator 1002 through the differentiating units 1012 and 1014 comes to the inputs of OR gate 1010 of sample-and-hold control signal formation circuit 1008. If the voltage of the signal at the non-inverting input of comparator 1002 corresponding to $\sin^2\theta$ is greater than the voltage of the signal (corresponding to $\sin^2\theta_{max}$) at the inverting input, the output voltage at the non-inverting output of comparator 1002 becomes equal to the voltage corresponding to logical value "true". Sample-and-hold control signal formation circuit 1008 under the influence of the voltage coming through one of the differentiating units produces the sample voltage which comes to the controlling input of switch 1016 in sample-and-hold circuit 1006, which is closed by this voltage. The time of action of the sample impulse voltage is selected so that it is sufficient to charge capacitor 1018 from the charge on capacitor 1020 connected to the input of switch 1016.

At the moment of action of comparator 1002, the voltage from its non-inverting output comes also to the bus 270 and determines the state of one of the digits of the code transmitted through this bus.

When the voltage of the signal at the non-inverting input of comparator 1002 corresponding to $\sin^2\theta$ becomes less than the voltage of the signal (corresponding to $\sin^2\theta_{max}$) at the inverting input, sample-and-hold circuit 1006 switches on from the voltage coming from the inverting output of comparator 1002 through differentiating circuit 1004 to the second input of OR gate 1010. At that moment the voltage from the non-inverting output of comparator 1002 comes to the bus 270 and changes the code digit to the opposite voltage.

The voltage of the signal received via connection 214 corresponding to the voltage of the received signal $P_{sum}$, comes through the second input of module 260 to the remaining input of module 268, is differentiated by RC circuit 1022 and comes to the non-inverting input of comparator 1004 where it is compared to the voltage coming from resistor 1024, which determines the threshold level of comparator 1004. In case when the dynamic component of the signal received via connection 214 coming from the non-inverting input of comparator 1064 is greater than the voltage at the inverting input, which is selected somewhat greater than the voltage of circuit instability recalculated to the non-inverting input of comparator 1004, at the output of comparator 1004 a voltage equal to logical value "true" is generated. The signal output from comparator 1004 comes through integrating circuit 1026 connected to the output of comparator 1004 and through switch 1016 to capacitor 1018, and charges capacitor 1018 during the connected state of switch 1016. The second digit of the code on bus 270 is determined by the voltage of switch 1016.

Differentiating circuit 1022 connected to the input of comparator 1004 is resistant to signals with the length close to or greater than the length of the package. The signal received via connection 214 coming from module 210 and corresponding to the power of the input signal of the receiver, appears after coming through low frequency filter suppressing noise in the frequency range 1/(time of passing N codes sufficient for synchronization) and higher.

With this diagram the following situations are distinguished, to which codes produced on bus 270 correspond.

1. In the case when the moment corresponding to fluctuation ($\sin^2\theta$) exceeding the allowed fluctuation level ($\sin^2\theta_{max}$) coincides with the process of increasing power of the signal $P_{sum}$, the signal code (11) appears on bus 270, corresponding to the break-up of receiving due to increased noise. Under the influence of this code, feedback transmitter 500 sends a signal instructing the other side to immediately raise transmission power to the maximum level or to increase transmission power in a stepwise manner until receiving the answer from the other side, or until receiving a successfully transmitted packet. This code, when transmitted over bus 270, causes the turning on of the feedback transmitter 500 in the maximum power mode.

Also, under the influence of this code transmitted through the connection line 274, module 500 must switch to the signal ("service" packet) transmission mode, switching the transmitter of the other side into the mode of maximum power packet transmission, or with power being raised stepwise up to the allowed limit until reliable data receiving by the station where module 260 is located becomes possible.

Case 1 can be summarized as follows:

When received signal power is increasing due to noise, the signal code (11) is produced on bus 270 to instruct the transmitter on the other side to increase signal power to its maximum value. This power increase to the maximum value is independent of the measured ratio $P_{min}$ to $P_s$, as evinced by the signal output from normalizer 262 via connection 266. Moreover, when the broadband noise affects the transmitter power level control signal and the received spread spectrum signal in a similar manner, the code (11) on bus 270 can be used to increase the power level of feedback transmitter 500.

2. In the case when the moment corresponding to the exceeding of the fluctuation ($\sin^2\theta$) over the maximum allowed fluctuation level ($\sin^2\theta_{max}$), coincides with the process of decreasing of the power of the received signal $P_{sum}$ code signal (10) appears on bus 270 corresponding to the normal end of packet transmission. This code coming through the bus 274, causes module 500 to switch to the transmission mode of the "service" packet, corresponding to normal transmission completion, with the same power determined by the "service" packet received from the transmitting station for the control of the power of the receiving station.

This code, transmitted through the transmission connection 274 by the feedback transmitter 500, must affect the transmitter of the other side so that it transmits the next packet with the power corresponding to signal 266 ($U_2$ (t)~$P_{min}/P_s$~$\sin^2\theta/\sin^2\theta_{max}$), which is determined by the ratio of the minimum allowed transmitter power to the actual power during the transmission of the previously transmitted packet.

Case 2 can be summarized as follows:

The code (10) on bus 270 is used to command the transmitter 300 on the other side to reduce, leave unchanged, or increase the power based on the ratio $P_{min}$ to $P_s$ as evinced by the signal 266 calculated during the previous packet. This code can also be used to adjust, i.e., reduce, increase, or leave unchanged, the power of feedback transmitter 500 on the other side based on the service packet received from the other side, in the case of a symmetrical communications system. Again, such control of the feedback transmitter power is possible in the case where noise similarly influences the spread spectrum broadband signal and the transmitter control signal. This can occur when the frequency bands of both channels are the same and modulation types of both channels are similar.

3. In the case when transmission becomes possible ($\sin^2\theta$ passes a minimum threshold) due to the increased power $P_{sum}$, the code (01) is generated, which comes through the bus 274, switches module 500 into the mode, in which it must, if necessary, operate as usual based on the information received from the other side, if the situation doesn't change until the end of the received packet, as in case of code (10).

Case 3 can be summarized as follows:

The code (01) is generated when the received power level exceeds the minimum threshold. However, the code (01) can only be used for switching feedback transmitter 500 into a mode in which it would be operating after the normal completion of a packet (case 2), if before the end of the packet there is no termination of receiving, which would lead to case 1. The code (01) is not used for controlling the power of transmitter 300 on the other side since the code (01) is generated at the beginning of a packet and is used to the end of the packet if there is no feedback.

4. In the case when the receiving under the conditions of reduced noise level, of which the reduction of $P_{sum}$ is sign of, code (00) is being generated.

Case 4 can be summarized as follows:

The code (00) is generated when the noise level is reduced, and the receiving started after reduction of the noise level. The code (00) can be preceded only by the code (11), which may signify the loss of the connection during transmission of preceding packets. Therefore, the code (00) prevents the transmitter on the other side from reducing power.

The following is a summary of the codes that can appear on bus 270.

Code (11)—increase of the transmitter power to the maximum (one time or step wise) despite the ratio of $P_{min}$ to $P_s$ Code (10)—requires adjustment of the power level according to the ratio of $P_{min}$ to $P_s$ Code (00)—prevents the transmitter from reducing power despite the ratio of $P_{min}$ to $P_s$ Code (01)—not used in power control.

Thus, the two bit binary code 270 output from RSMNPLC 260 determines whether the difference between $\sin^2(\theta)$ and $\sin^2(\theta_{max})$ is the result of noise or the end of package transmission of useful information. This binary code information along with the calculated ratio of instantaneous signal power to the minimum instantaneous acceptable signal power at a given signal noise power level is subsequently broadcast back to the "originating" DSSS transmitter 300, which in turn uses this information to "decide" whether it is necessary to change the signal power during the next data transmission.

More particularly, as indicated in FIG. 10, the feedback control component signals 266 and 270 are provided as input to the signal multiplexing module 272 which is adapted to multiplex the multiple signal components into a serial bit stream 274 that is suitable for transmission back to the "originating" DSSS transmitter 300.

Figure 11:
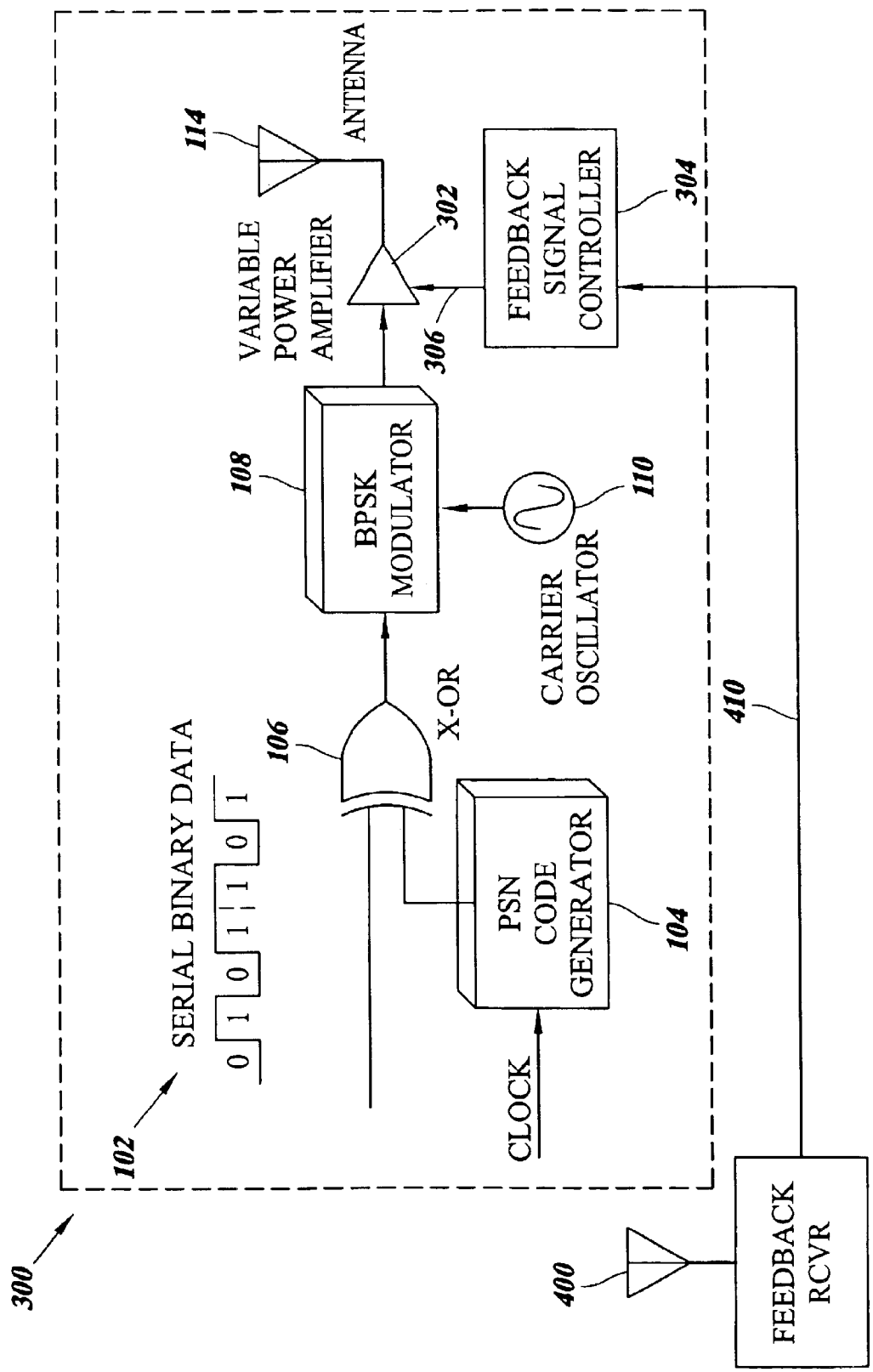
FIG. 11 is a schematic block diagram of a DSSS transmitter of the present invention that is capable of utilizing a power level control feedback signal.

Shown in FIG. 11 is one embodiment of the transceiver pair comprised of DSSS transmitter 300 and feedback receiver 400. DSSS transmitter 300 includes a PSN code generator 104, which is adapted to receive input from a high frequency clock source. Coupled to the output of PSN code generator 104 is a logic "exclusive OR" or XOR gate 106. XOR gate 106 is also configured to take as input, a user data stream 102. The "spread" signal output from XOR gate 106 is then directed to a BPSK modulating process 108, where the signal is BPSK modulated with the aid of a carrier oscillator 110. A variable power amplifier (VPA) 302 is adapted to receive the BPSK modulated signal as well as a power level feedback control signal 306. Power level feedback control signal 306 is provided by a Feedback Signal Controller (FSC) 304, which is adapted to receive, de-multiplex, and process the received power level feedback control signal 410 so as to insure that the power control information is in a format that is compatible with VPA 302. Power level feedback control signal 306 is used to adjust the output power level of VPA 302. The amplified output signal produced by VPA 302 is subsequently broadcast via a transmission antenna 114. With particular regard to FSC process 304, it will be appreciated that in an alternate embodiment the de-multiplexing operation performed by this process could easily be performed at the receiver where the power level control signal is received. In such a case, FSC process 304 would simply receive the two bit binary code and perform any pre-processing or formatting required to meet the operational specifications of the associated VPA 302.

This power regulation can be performed by known methods, for example by changing voltage of the power supply at the transmitter power amplifier 302 (recommended in cases when the transmitter operates in the modes corresponding to cases 3 and 4), and also by providing power supply to all the output cascades of the transmitter 302 which use the principle of power addition (recommended for the case of corresponding transmitter design), as well as by signal level control for intermediate cascades of the transmitter 500 (302) (recommended for transmitters, the output cascades of which operate in linear mode corresponding to case 1) etc.

FSC 304 illustrated in FIG. 11 represents a demultiplexer which forms from the power level feedback control signal received via connection 310 a signal output over connection 306 to control the output power of variable power amplifier 302. The signal on connection 306 may represent a digital code, an analog signal, or a combined digital and analog signal depending on the method for controlling the output of variable power amplifier 302. The selection of the control mechanism for variable power amplifier 302 may be any mechanism known by those of ordinary skill in the art and is not the subject of the present invention.

From FIG. 11 one can see that the power level feedback control signal is provided to DSSS transmitter 300 by the associated feedback receiver 400.

DSSS System Operation

As indicated in FIG. 4, the DSSS system of the present invention is designed so as to permit real-time transmission power level control via an associated feedback subsystem. In one embodiment, a DSSS system 180 includes a first transceiver unit that is comprised of a DSSS transmitter component 300 and feedback receiver component 400. Also included is a second transceiver unit that is similarly comprised of a DSSS receiver component 200 and a feedback transmitter component 500. From a high-level functional standpoint, the real-time transmission power level control feedback loop is established in DSSS system 180 as DSSS transmitter 300 formulates and broadcasts a spread spectrum broadband signal. This broadband signal is received and generally decoded by DSSS receiver 200. DSSS receiver 200 uses the received broadband signal to generate a power level control signal that is subsequently broadcast by feedback transmitter 500 and received by feedback receiver 400.

Feedback receiver 400 communicates the received power level control signal information to DSSS transmitter 300 which, in turn, uses this control information to adjust its transmission power level. It will be appreciated that the same power level control feedback loop could be implemented between feedback transmitter 500 and feedback receiver 400, so as to generally establish a system wide or bi-directional closed-loop feedback configuration. As such, optimal transmission power levels can be maintained in real or near-real time within the DSSS communication system of the present invention.

Beginning with DSSS transmitter 300, it will be appreciated that a binary data stream 102 representing useful or user data is input to the transmitter from an external data source, as indicated in FIG. 11. This user data stream 102 is combined at XOR gate 106 with a spreading code sequence that is generated by PSN code generator 104. The resulting encoded or "spread" user data signal is then modulated using a BPSK scheme by BPSK modulator 108. In preparation for transmission, the modulated user data signal is then amplified to a particular power level by VPA 302. It will be appreciated that in the case of an initial transmission, the modulated user data signal may be amplified to a relatively high power level, so as to ensure that the corresponding DSSS receiver 200 has the best chance of successfully receiving the signal and decoding the user data. Subsequent feedback control iterations might then act to reduce the VPA power level, so as generally seek the minimum necessary transmission power level required for successful and reliable reception of the user signal.

In any event, it will be appreciated that the "spread", modulated, and amplified user data signal is received by DSSS receiver 200 via the receiving antenna 122, as indicated in FIG. 6. The weak, received user data signal is amplified by RF amplifier 124 and subsequently mixed with an intermediate frequency local oscillator signal generated by oscillator 128. This intermediate frequency-mixed signal is then directed to the phase demodulator/demodulated signal processor or correlator 130. Those skilled in the art of spread spectrum communication systems will appreciated that the clock oscillator 136, PSN code generator 134, and synchronization process 140 all function together in a manner that is well known and understood, so as to result in the 'de-spreading' and demodulation of the received user data signal. As such DSSS functionality is not particularly relevant to the power level control feedback concept of the present invention, a detailed discussion of such basic operations is not presented herein.

It should suffice to state that the received user data signal is effectively decoded and demodulated, with the recovered user data stream being output from correlator 130. This recovered binary user data stream is subsequently provided as input to the Received Signal Phase Fluctuation Measurement (RSPFM) module 240 as input signal 242. Also included as input to RSPFM module is a clock signal 243 that is produced by the same oscillator 136 which drives PSN code generator 134. As generally illustrated in FIG. 8, maximum and minimum signal amplitude detectors 246 and 248, respectively, produce signals that enable the normalizer process 252 to effectively calculate a normalization parameter $((V_{max}-V_{min})/V_{max})$ related to the binary user data stream. This normalization parameter is output from RSPFM module 240 as signal 244.

Returning again to FIG. 6, it will be appreciated that the received user data signal is tapped immediately following amplification by RF amplifier 124 and prior to mixing with the heterodyne frequency generated by oscillator 128. This encoded and modulated user data signal is provided as input to the Received Signal Power Level Measurement (RSPLM) module 210, where the signal is subsequently multiplied by itself or effectively squared by multiplier process 216, as indicated in FIG. 7. The result of this squaring process is then filtered and output from RSPLM module 210 as output signal 214. As discussed previously, this output signal is referred to as $P_{sum}$, and is representative of the instantaneous power level of the received user data or information signal.

Turning now to RSPFM module 240, it will be appreciated that the minimum and maximum signal level measurement modules 248 and 246, respectively, are each adapted to receive the phase demodulated and "de-spread" received signal via signal connection 242, as shown in FIGS. 6 and 8. The output signals produced by the maximum and minimum voltage level detectors 246 and 248, respectively, are provided as input to the signal voltage level difference calculation process 250. Difference calculation process 250 generates an output signal that is proportional to the difference in magnitudes of maximum and minimum signal voltage levels. The output signals from both the maximum signal level measurement module 246 and the signal voltage level difference calculation process 250 are provided as inputs to the signal voltage level normalizer process 252, where the difference input signal is normalized with respect to the maximum voltage level input signal, thereby essentially computing the ratio of the difference input signal to the maximum voltage level signal $((V_{max}-V_{min})/V_{max})$. This normalized signal, which is the approximate equivalent of $sin^2(\theta)$, is subsequently output via connection 244.

RSMNPLC module 260 is adapted to receive the normalized signal ad 244, as well as the instantaneous power level of the received user data or information signal, $P_{sum}$ 214. These two input signals, in conjunction with a reference voltage signal that is generated within the RSMNPLC, process are employed to produce a pair of power level control feedback signals, 266 and 270. Feedback control signal component 266 is indicative of the ratio of instantaneous signal power to the minimum instantaneous acceptable signal power at a given signal noise power level, while the two bit binary control signal 270 essentially indicates whether the difference between $sin^2(\theta)$ and $sin^2(\theta_{max})$ is the result of noise or is instead an artifact of the end of a package transmission of useful information.

In the embodiment shown in FIG. 10, these two power level control signal components are multiplexed into a serial bit stream 274 and subsequently broadcast back to the "originating" DSSS transmitter 300, which in turn uses this information to "decide" whether it is necessary to change the signal power during the next data transmission. More particularly, it will be appreciated from FIG. 111 that feedback receiver 400 receives the power level control signal information that is broadcast by the associated feedback transmitter 500. In the embodiment described herein, receiver 400 delivers the multiplexed power level control information signal 410 to the feedback signal controller 304, where any necessary de-multiplexing and control signal re-construction operations are performed. A VPA compatible power level control signal 306 is then provided to the associated VPA 302 where power level control is asserted.

It will be understood that various details of the invention may be changed without departing from the scope of the invention. Furthermore, the foregoing description is for the purpose of illustration only, and not for the purpose of limitation—the invention being defined by the claims.

What is claimed is:

1. A spread spectrum communication system for automatically adjusting transmission power level to optimize one or more aspects of the spread spectrum communication system performance, the communication system comprising:
(a) a first spread spectrum transceiver adapted to transmit a spread spectrum signal, to receive and process transmission power level control information, and to adjust transmission power in accordance with the received transmission power level control information; and
(b) a second spread spectrum transceiver adapted to receive the spread spectrum signal sent by the first spread spectrum transceiver and to subsequently generate the transmission power level control information, wherein the transmission power level control information includes a first component indicative of a ratio of a minimum acceptable received power level of the spread spectrum signal for a predetermined noise power level to a received power level of the spread spectrum signal, wherein the ratio is indicative of a minimum acceptable instantaneous received signal power of the Spread spectrum signal to an instantaneous received signal power of the spread spectrum signal.

2. A spread spectrum communication system for automatically adjusting transmission power level to optimize one or more aspects of the spread spectrum communication system performance, the communication system comprising:
(a) a first spread spectrum transceiver adapted to transmit a spread spectrum signal, to receive and process transmission power level control information, and to adjust transmission power in accordance with the received transmission power level control information; and
(b) a second spread spectrum transceiver adapted to receive the spread spectrum signal sent by the first spread spectrum transceiver and to subsequently generate the transmission power level control information, wherein the transmission power level control information includes a first component indicative of a ratio of a minimum acceptable received power level of the spread spectrum signal for a predetermined noise power level to a received power level of the spread spectrum signal, wherein the transmission power level control information includes a second component having a code for instructing the first spread spectrum transceiver as to how to utilize the first component in adjusting the transmission power.

3. The spread spectrum communication system of claim 2 wherein the code includes a first value for instructing the first spread spectrum transceiver to increase the transmission power independently of the first component when a received power level of the spread spectrum signal increases due to noise.

4. The spread spectrum communication system of claim 3 wherein the code includes a second value for instructing the first spread spectrum transceiver to adjust the transmission power based on the first component when the received power level is decreasing due to the end of a normal transmission of the spread spectrum signal.

5. The spread spectrum communication system of claim 4 wherein the code includes a third value for instructing the first spread spectrum transceiver to stop increasing the transmission power when the received power level exceeds a minimum threshold.

6. The spread spectrum communication system of claim 5 wherein the code includes a fourth value for preventing the first spread spectrum transceiver from adjusting the transmission power when noise power level of the received spread spectrum signal is reduced.

7. The spread spectrum communication system of claim 1 wherein the first and second spread spectrum transceivers employ a direct sequence spread spectrum (DSSS) modulation scheme.

8. The spread spectrum communication system of claim 1 wherein the first and second spread spectrum transceivers employ a frequency hopping spread spectrum (FHSS) modulation scheme.

9. The spread spectrum communication system of claim 1 wherein the transmission power level control information is in the form of a digital signal.

10. A spread spectrum communication system for automatically adjusting transmission power level to optimize one or more aspects of the spread spectrum communication system performance, the communication system comprising:
(a) a first spread spectrum transceiver adapted to transmit a spread spectrum signal, to receive and process transmission power level control information, and to adjust transmission power in accordance with the received transmission power level control information; and
(b) a second spread spectrum transceiver adapted to receive the spread spectrum signal sent by the first spread spectrum transceiver and to subsequently generate the transmission power level control information, wherein the transmission power level control information includes a first component indicative of a ratio of a minimum acceptable received power level of the spread spectrum signal for a predetermined noise power level to a received power level of the spread spectrum signal, wherein the transmission power level control information is in the form of an analog signal.

11. The spread spectrum communication system of claim 1 wherein the first spread spectrum transceiver includes a spread spectrum transmitter for transmitting the spread spectrum signal and a feedback receiver for receiving the transmission power level control information and wherein the second spread spectrum transceiver includes a spread spectrum receiver for receiving the spread spectrum signal and a feedback transmitter for transmitting the transmission power level control information.

12. A spread spectrum communication system for automatically adjusting transmission power level to optimize one or more aspects of the spread spectrum communication system performance, the communication system comprising:
(a) a first spread spectrum transceiver adapted to transmit a spread spectrum signal, to receive and process transmission power level control information, and to adjust transmission power in accordance with the received transmission power level control information; and
(b) a second spread spectrum transceiver adapted to receive the spread spectrum signal sent by the first spread spectrum transceiver and to subsequently generate the transmission power level control information, wherein the transmission power level control information includes a first component indicative of a ratio of a minimum acceptable received power level of the spread spectrum signal for a predetermined noise power level to a received power level of the spread spectrum signal, wherein the second spread spectrum transceiver includes a narrow-band transmitter and wherein the first spread spectrum transceiver includes a narrow-band receive.

13. A method for providing automatic control of the transmitted power of a spread spectrum signal in a spread spectrum communication system, the method comprising:

(a) at a first spread spectrum transmitter, transmitting a spread spectrum signal;
(b) at a first spread spectrum receiver;
  (i) receiving the spread spectrum signal
  (ii) determining a ratio of a minimum acceptable received power level of the spread spectrum signal to a received power level of the spread spectrum signal;
  (iii) formulating a transmission power level control signal having a first component indicative of the ratio; and
  (iv) providing the transmission power level control signal to a second transmitter;
(c) at the second transmitter, transmitting the transmission power level control signal;
(d) at a second receiver, receiving the transmission power level control signal and providing transmission power level control signal information to the first spread spectrum transmitter; and
(e) at the first spread spectrum transmitter, using the transmission power level control signal information to adjust transmission power level, wherein the transmission power level control signal includes a second component having a code for instructing the first spread spectrum transmitter as to how to utilize the first component in adjusting the transmission power level.

14. The method of claim 13 wherein the code includes a first value for instructing the first spread spectrum transmitter to increase the transmission power level independently of the first component when a received power level of the spread spectrum signal increases due to noise.

15. The method of claim 14 wherein the code includes a second value for instructing the first spread spectrum transmitter to adjust the transmission power level based on the first component when the received power level is decreasing due to the end of a normal transmission of the spread spectrum signal.

16. The method of claim 15 wherein the code includes a third value for instructing the first spread spectrum transmitter to stop increasing the transmission power level when the received power level exceeds a minimum threshold.

17. The method of claim 16 wherein the code includes a fourth value for preventing the first spread spectrum transmitter from adjusting the transmission power level when noise power level of the received spread spectrum signal is reduced.

18. A spread spectrum receiver comprising:
(a) means for receiving a spread spectrum signal originating from a spread spectrum transmitter;
(b) means for demodulating the spread spectrum signal;
(c) a received signal power level measurement module operatively associated with the means for receiving for producing a first output signal indicative of a received power level of the spread spectrum signal;
(d) a received signal phase fluctuation measurement module operatively associated with the means for demodulating for producing a second output signal indicative of a ratio of the noise power density of the spread spectrum signal to an information power density of the spread spectrum signal; and
(e) a received minimum necessary power level calculation circuit operatively associated with the received signal power level measurement circuit and the received signal phase fluctuation measurement module for producing, based on the first and second output signals, a third output signal having a first component indicative of a ratio of the minimum acceptable received instantaneous spread spectrum signal power to the instantaneous received power of the spread spectrum signal at the spread spectrum receiver, wherein the third output signal includes a second component having a code for instructing the spread spectrum transmitter as to whether to ignore the first component of the third output signal when adjusting transmitted power of the spread spectrum signal.

19. The spread spectrum receiver of claim 18 wherein the code includes a first value for instructing the spread spectrum transmitter to increase the transmitted power independently of the first component of the third signal when the received power level of the spread spectrum signal increases due to noise.

20. The spread spectrum receiver of claim 19 wherein the code includes a second value for instructing the spread spectrum transmitter to adjust the transmitted power of the spread spectrum signal based on the first component of the third signal when the received power level is decreasing due to the end of a normal transmission of the spread spectrum signal.

21. The spread spectrum receiver of claim 20 wherein the code includes a third value when the received power level of the spread spectrum signal exceeds a minimum threshold.

22. The spread spectrum signal receiver of claim 21 wherein the code includes a fourth value for preventing the spread spectrum transmitter from reducing the transmitted power of the spread spectrum signal, irregardless of the first component of the third output signal, when noise power level of the received spread spectrum signal is reduced.

23. A spread spectrum communication system for automatically adjusting transmission power level to optimize one or more aspects of the spread spectrum communication system performance, the communication system comprising:
(a) a first spread spectrum transceiver adapted to transmit a spread spectrum signal, to receive and process transmission power level control information, and to adjust transmission power in accordance with the received transmission power level control information; and
(b) a second spread spectrum transceiver adapted to receive the spread spectrum signal sent by the first spread spectrum transceiver and to subsequently generate the transmission power level control information, wherein the transmission power level control information includes a first component indicative of a ratio of a minimum acceptable received power level of the spread spectrum signal for a predetermined noise power level to a received power level of the spread spectrum signal, wherein the ratio is calculated using the expression $\sin^2\theta$ divided by $\sin^2\theta_{max}$, where $\theta$ is the instantaneous phase variation of the spread spectrum signal and $\theta_{max}$ is the maximum instantaneous phase variation of the spread spectrum signal.

24. A method for providing automatic control of the transmitted power of a spread spectrum signal in a spread spectrum communication system, the method comprising:
(a) at a first spread spectrum transmitter, transmitting a spread spectrum signal;
(b) at a first spread spectrum receiver;
  (i) receiving the spread spectrum signal;
  (ii) determining a ratio of a minimum acceptable received power level of the spread spectrum signal to a received power level of the spread spectrum signal;
  iii) formulating a transmission power level control signal having a first component indicative of the ratio; and (iv) providing the transmission power level control signal to a second transmitter;

(c) at the second transmitter, transmitting the transmission power level control signal;

(d) at a second receiver, receiving the transmission power level control signal and providing transmission power level control signal information to the first spread spectrum transmitter; and (e) at the first spread spectrum transmitter, using the transmission power level control signal information to adjust transmission power level, wherein the ratio is indicative of a minimum acceptable instantaneous received signal power of the spread spectrum signal to an instantaneous received signal power of the spread spectrum signal.

25. A method for providing automatic control of the transmitted power of a spread spectrum signal in a spread spectrum communication system, the method comprising:

(a) at a first spread spectrum transmitter, transmitting a spread spectrum signal;

(b) at a first spread spectrum receiver;
　(i) receiving the spread spectrum signal;
　(ii) determining a ratio of a minimum acceptable received power level of the spread spectrum signal to a received power level of the spread spectrum signal;
　(iii) formulating a transmission power level control signal having a first component indicative of the ratio; and
　(iv) providing the transmission power level control signal to a second transmitter;

(c) at the second transmitter, transmitting the transmission power level control signal;

(d) at a second receiver, receiving the transmission power level control signal and providing transmission power level control signal information to the first spread spectrum transmitter; and (e) at the first spread spectrum transmitter, using the transmission power level control signal information to adjust transmission power level, wherein the ratio is calculated by the expression $\sin^2\theta$ divided by $\sin^2\theta_{max}$, where $\theta$ is the instantaneous phase variation of the spread spectrum signal and $\theta_{max}$ is the maximum instantaneous phase variation of the spread spectrum signal.

26. A spread spectrum receiver comprising:

(a) means for receiving a spread spectrum signal originating from a spread spectrum transmitter;

(b) means for demodulating the spread spectrum signal;

(c) a received signal power level measurement module operatively associated with the means for receiving for producing a first output signal indicative of a received power level of the spread spectrum signal;

(d) a received signal phase fluctuation measurement module operatively associated with the means for demodulating for producing a second output signal indicative of a ratio of the noise power density of the spread spectrum signal to an information power density of the spread spectrum signal; and (e) a received minimum necessary power level calculation circuit operatively associated with the received signal power level measurement circuit and the received signal phase fluctuation measurement module for producing, based on the first and second output signals, a third output signal having a first component indicative of a ratio of the minimum acceptable received instantaneous spread spectrum signal power to the instantaneous received power of the spread spectrum signal at the spread spectrum receiver, wherein the ratio is calculated by the expression $\sin^2\theta$ divided by $\sin^2\theta_{max}$, where $\theta$ is the instantaneous phase variation of the spread spectrum signal and $\theta_{max}$ is the maximum instantaneous phase variation of the spread spectrum signal.

* * * * *